(12) United States Patent
Skou et al.

(10) Patent No.: US 11,529,588 B2
(45) Date of Patent: Dec. 20, 2022

(54) MEMBRANE CLEANING SOLUTION AND METHOD OF ACCELERATED MEMBRANE CLEANING USING THE SAME

(71) Applicant: Diversey, Inc., Fort Mill, SC (US)

(72) Inventors: Flemming Skou, Vanloese (DK); Sandy te Poele, Eindhoven (NL); Harry Kany, Hettenleidelheim (DE)

(73) Assignee: Diversey, Inc., Fort Mill, SC (US)

( * ) Notice: Subject to any disclaimer, the term of this patent is extended or adjusted under 35 U.S.C. 154(b) by 0 days.

(21) Appl. No.: 16/627,370

(22) PCT Filed: Jun. 29, 2018

(86) PCT No.: PCT/US2018/040210
§ 371 (c)(1),
(2) Date: Dec. 30, 2019

(87) PCT Pub. No.: WO2019/006252
PCT Pub. Date: Jan. 3, 2019

(65) Prior Publication Data
US 2020/0164316 A1    May 28, 2020

Related U.S. Application Data

(60) Provisional application No. 62/527,162, filed on Jun. 30, 2017.

(51) Int. Cl.
*B01D 65/06* (2006.01)
*B01D 65/02* (2006.01)

(52) U.S. Cl.
CPC ........ *B01D 65/06* (2013.01); *B01D 2321/162* (2013.01); *B01D 2321/166* (2013.01); *B01D 2321/168* (2013.01)

(58) Field of Classification Search
CPC ........ B01D 2321/162; B01D 2321/164; B01D 2321/166; B01D 2321/168; B01D 65/02;
(Continued)

(56) References Cited

U.S. PATENT DOCUMENTS

| 5,118,623 A | 6/1992 | Boguslawski et al. |
| 5,399,555 A | 3/1995 | Vandevelde et al. |

(Continued)

FOREIGN PATENT DOCUMENTS

| CA | 2197314 A | 3/1996 |
| EP | 0585363 B1 | 4/1995 |

(Continued)

OTHER PUBLICATIONS

Wui Seng Ang, Sangyoup Lee, Menachem Elimelech, Chemical and physical aspects of cleaning of organic-fouled reverse osmosis membranes, Journal of Membrane Science 272 (2006) 198-210. (Year: 2006).*

(Continued)

*Primary Examiner* — Pranav N Patel
(74) *Attorney, Agent, or Firm* — Warunee Srisiri-Sisson

(57) ABSTRACT

A cleaning solution for accelerated cleaning of a membrane having an enzyme and an agent having a pH that is compatible with the enzyme. The cleaning solution may additionally include one or both of a binding agent and a surfactant. Once the cleaning solution has been included in a solution that is used to contact the membrane for a defined period of time, one or both of a binding agent and a reducing agent may be added to the solution that has contacted the membrane. Optionally, one or both of increasing a pH of the solution and increasing a temperature of the solution may be used to reduce an activity of the enzyme.

21 Claims, 5 Drawing Sheets

(58) Field of Classification Search
CPC . B01D 65/06; B01D 2321/16; B01D 2321/28
See application file for complete search history.

(56) References Cited

U.S. PATENT DOCUMENTS

| | | | |
|---|---|---|---|
| 5,792,506 | A | 8/1998 | Buchanan et al. |
| 5,814,591 | A | 9/1998 | Mills et al. |
| 5,858,117 | A | 1/1999 | Oakes et al. |
| 5,861,366 | A | 1/1999 | Ihns et al. |
| 5,948,741 | A | 9/1999 | Ochomogo et al. |
| 5,948,742 | A | 9/1999 | Chang et al. |
| 5,952,034 | A | 9/1999 | Buchanan et al. |
| 5,972,876 | A | 10/1999 | Robbins et al. |
| 6,004,916 | A | 12/1999 | Mills et al. |
| 6,197,739 | B1 | 3/2001 | Oakes et al. |
| 6,211,129 | B1 | 4/2001 | Gladfelter et al. |
| 6,214,784 | B1 | 4/2001 | Robbins et al. |
| 6,245,728 | B1 | 6/2001 | Robbins et al. |
| 6,358,909 | B1 | 3/2002 | Ochomogo et al. |
| 6,455,484 | B1 | 9/2002 | Gladfelter et al. |
| 6,489,278 | B1 | 12/2002 | Lentsch et al. |
| 6,624,132 | B1 | 9/2003 | Man et al. |
| 6,664,219 | B1 | 12/2003 | Lentsch et al. |
| 6,767,884 | B2 | 7/2004 | Lentsch et al. |
| 6,790,817 | B2 | 9/2004 | Gladfelter et al. |
| 6,835,706 | B2 | 12/2004 | Lentsch et al. |
| 6,956,019 | B2 | 10/2005 | Lentsch et al. |
| 7,179,781 | B2 | 2/2007 | Fine et al. |
| 7,199,095 | B2 | 4/2007 | Lentsch et al. |
| 7,220,358 | B2 | 5/2007 | Schacht et al. |
| 7,517,846 | B2 | 4/2009 | Gladfelter et al. |
| 7,553,806 | B2 | 6/2009 | Man et al. |
| 7,572,759 | B2 | 8/2009 | Fine et al. |
| 7,662,289 | B2 | 2/2010 | Musale et al. |
| 7,723,281 | B1 | 5/2010 | Herdt et al. |
| 7,749,282 | B2 | 7/2010 | Fine et al. |
| 7,964,548 | B2 | 6/2011 | Herdt et al. |
| 8,227,397 | B2 | 7/2012 | Herdt et al. |
| 8,961,699 | B2 | 2/2015 | Classen et al. |
| 2005/0020466 | A1 | 1/2005 | Man et al. |
| 2005/0184008 | A1 | 8/2005 | Schacht et al. |
| 2006/0035808 | A1 | 2/2006 | Fahim et al. |
| 2010/0317734 | A1 | 12/2010 | Folan et al. |
| 2011/0008870 | A1 | 1/2011 | Makinen et al. |
| 2012/0015858 | A1 | 1/2012 | Kessler et al. |
| 2012/0088710 | A1 | 4/2012 | Kessler et al. |
| 2012/0252064 | A1 | 10/2012 | Leena et al. |
| 2013/0084626 | A1 | 4/2013 | Choczaj et al. |
| 2014/0193888 | A1 | 7/2014 | Souter et al. |
| 2014/0202500 | A1 | 7/2014 | Monsrud et al. |
| 2014/0251385 | A1 | 9/2014 | Kelly-Murray et al. |
| 2014/0274857 | A1 | 9/2014 | Schacht et al. |
| 2015/0056679 | A1 | 2/2015 | Patten et al. |
| 2015/0175936 | A1* | 6/2015 | Kingma ............... C11D 1/72 510/162 |
| 2017/0173642 | A1 | 6/2017 | Li et al. |
| 2018/0021735 | A1 | 1/2018 | Blackman et al. |
| 2018/0298372 | A1* | 10/2018 | Funkner ............... C12P 19/34 |

FOREIGN PATENT DOCUMENTS

| | | |
|---|---|---|
| EP | 0778880 B1 | 10/1998 |
| EP | 1656987 A1 | 5/2006 |
| EP | 1675935 B1 | 12/2007 |
| WO | 9947631 A1 | 9/1999 |
| WO | 99/50380 A1 | 10/1999 |
| WO | 99/64552 A1 | 12/1999 |
| WO | 2004074419 A2 | 9/2004 |
| WO | 2008101958 A1 | 8/2008 |
| WO | 2012048334 A2 | 4/2012 |
| WO | 2005/035705 A2 | 4/2015 |
| WO | 2015051896 A1 | 4/2015 |
| WO | 2015051901 A1 | 4/2015 |
| WO | 2016046334 A1 | 3/2016 |
| WO | 2016079110 A2 | 5/2016 |
| WO | 2016/107855 A1 | 7/2016 |
| WO | 2017/106623 A1 | 6/2017 |
| WO | 2017/177016 A1 | 10/2017 |

OTHER PUBLICATIONS

Maria A. Argu Ello, Silvia Alvarez, Francisco A. Riera, and Ricardo Alvarez, Enzymatic Cleaning of Inorganic Ultrafiltration Membranes Fouled by Whey Proteins, J. Agric. Food Chem. 2002, 50, 1951-1958. (Year: 2002).*

H.B. Petrus, H. Li, V. Chen*, N. Norazman, Enzymatic cleaning of ultrafiltration membranes fouled by protein mixture solutions, Journal of Membrane Science 325 (2008) 783-792. (Year: 2008).*

Z. Allie, E.P. Jacobs, A. Maartens, P. Swart, Enzymatic cleaning of ultrafiltration membranes fouled by abattoir effluent, Journal of Membrane Science 218 (2003) 107-116. (Year: 2003).*

Lydie Paugam et al—Cleaning of skim milk PES ultrafiltration membrane: On the real effect of nitric acid step, Journal of Membrane Science 428 (2013) 275-280. (Year: 2013).*

Jurgen Bajorath, Winfried Hinrichs and Wolfram Saenger, Eur. J. Biochem. 176,441-447 (1988). (Year: 1988).*

International Search Report and Written Opinion dated Oct. 5, 2018 for Application No. PCT/US2018/040210; 10 pages.

U.S. Statutory Invention Registration No. H1680, Prieto, Published Sep. 2, 1997, 8 pages.

Office Action dated Jul. 8, 2021 for counterpart Indian Application No. 201937054342; 6 pages.

Ang et al., "Chemical and physical aspects of cleaning of organic-fouled reverse osmosis membranes," Journal of Membrane Science, vol. 272, Sep. 6, 2005, pp. 198-210.

* cited by examiner

MEMBRANE CLEANING SOLUTION AND METHOD OF ACCELERATED MEMBRANE CLEANING USING THE SAME

CROSS-REFERENCE TO RELATED APPLICATIONS

This application claims priority to co-pending U.S. Provisional Application No. 62/527,162, filed on Jun. 30, 2017, which is incorporated herein by reference in its entirety.

FIELD OF INVENTION

The present invention relates to a cleaning solution for use in a cleaning operation for a filtration membrane. The present invention also provides the method of use of such a cleaning solution.

BACKGROUND

Filtration is the separation of one material from another. Filtration may be effected by the use of a membrane. The material that is retained on the membrane is characterized as the retentate or concentrate. The liquid that passes through the membrane is the solute, filtrate or permeate, the latter being the term most commonly used with respect to membrane filtration.

Soil remaining on the membrane after processing the stream is characterized as membrane fouling. These membrane filters must be subsequently subjected to a cleaning operation for the removal of any fouling that has occurred during the course of the treatment operation in order to continue to use such a filtration system for the continued production of permeate.

In the dairy, brewing & beverage, and processed food operations, membrane plants are used for fractioning, separation and up concentration of desired product components. Such membrane filters must then be subsequently subjected to a cleaning operation for the removal of any fouling that has occurred during the process.

Conventionally, hydraulic and/or chemical treatments have been used to clean these fouled membranes. However, these methods have not been entirely effective at efficiently removing most all of the deposited materials. Process that do provide a substantial removal of fouled material tend to be time consuming, costly in terms of energy and water usage over the multiple number of steps conventionally employed in such operations and in chemical treatments conventionally required for such cleaning operations.

Cleaning agents have been formulated to specifically address the nature and physicochemical properties of the foulants. These cleaning agents are formulated to attempt to break down the bonds that form between the foulants and the material the membrane is constructed from.

Chemical cleaning involves several steps that must be carried out in a specific defined order. First, the membrane must be rinsed to remove soils that have not readily become deposited on the membrane. The chemical cleaning solution can then be introduced to the membrane and held in place at the membrane for a certain defined time. Such cleaning steps must then be followed by another rinse step. The membrane is conventionally then subjected to other steps to remove the cleaning solution from the membrane including perhaps an acid treatment step and/or an alkaline treatment step with each of the employed steps being followed by another rinsing step.

Four parameters primarily determine the effectiveness of a cleaning agent. These parameters include contact time, chemical reaction, temperature and mechanical energy. These parameters are specifically related to the chemical-based cleaning agent being deployed as well as the nature of the foulants deposited on the membrane. The object of the present invention is to provide a process for cleaning a filtration membrane.

Cleaning agents have also included enzymes for enzymatic treatment of the membrane. Enzymatic treatment has been used in the cleaning operations for such membranes to break the deposited materials down into smaller compounds allowing for them to be more easily removed from the membrane. An enzymatic cleaning step can advantageously reduce or eliminate irreversible fouling that is likely caused by organic soil, e.g., protein and lipid adsorption on the membrane. Protease enzymes, in particular, catalyze the reaction of hydrolysis of various bonds using a water molecule.

There remains a need in the art to provide an enzyme-based cleaning solution and a membrane cleaning operation that effectively reduces or eliminates irreversible fouling. If the filtration resistance after hydraulic cleaning is equal to the filtration resistance at the start of the previous filtration period then the fouling is considered to be complete reversible. If chemical cleaning needs to be applied, then the fouling is considered to be irreversible. There is a long-felt need for such a cleaning operation that can be accomplished with a reduction in any one or more of overall time, water usage, energy and chemicals.

SUMMARY OF INVENTION

The present invention relates to an enzyme-based cleaning method for cleaning membranes. Without intending to be bound by theory, the cleaning method of the invention results in a reduction in one or more of cleaning time, overall water usage, energy, and chemicals relative to conventional cleaning operations.

An aspect of the invention provides a method of cleaning a membrane comprising: pre-rinsing the membrane; cleaning the membrane using a solution comprising an enzyme and an agent having a pH compatible with the enzyme, the composition having a temperature compatible with the membrane; prevention of divalent ions in the solution from precipitation; reducing the enzyme activity; and post-rinsing the membrane for removal of the solution. In an embodiment of the invention, the solution may additionally comprises a binding agent. In certain embodiments of the invention, the solution additionally comprises a surfactant. Further pursuant to this embodiment of the invention, the surfactant may comprise at least one of an anionic, a non-ionic and an amphoteric surfactant.

According to an embodiment of the invention the solution for cleaning the membrane may additionally comprise a binding agent. Further pursuant to this embodiment, the binding agent may comprise at least one of ethylenediaminetetraacetic acid (EDTA) and any salt thereof, (hydroxyethyl)ethylenediaminetriacetic acid (HEDTA) and any salt thereof, potassium tripolyphosphate (KTPP), a phosphonic acid and any salt thereof, nitrilotriacetic acid (NTA) and any salt thereof, diethylene triamine pentaacetic acid (DTPA) and any salt thereof, gluconic acid (GA) and any salt thereof, glutamic acid diacetic acid (GLDA) and any salt thereof, methylglycinediacetic acid (MGDA) and any salt thereof, iminodisuccinc acid (IDS) and any salt thereof, aminocarboxylic acids and any salt thereof, hydroxyethane diphosphonic acid (HEDP) and any salt thereof, aminotris(methylenephosphonic acid) (ATMP) and any salt thereof, 2-phosphonobutane-1,2,4-tricarboxylic acid (PBTC) and any salt thereof, ethylenediamine tetra(methylene phosphonic acid) (EDTMP) and any salt thereof, diethylenetriamine penta(methylene phosphonic acid) (DTPMP) and any salt thereof, a polyacrylate, an acrylic acid-maleic acid copolymer and any salt thereof, and sodium gluconate (Na-gluconate) and any combinations thereof. Further pursuant to this embodiment of the invention, a concentration of the binding agent is from about 0.001 wt % to about 1 wt % based on the overall weight of the solution. In an embodiment of the invention, the binding agent comprises a partially neutralized polyacrylic acid having a molecular weight in the range of about 2.5 k to about 5 k In certain embodiments of the invention, the method of cleaning the membrane, additionally comprises the step of adding a binding agent for deactivation of the enzyme. Further pursuant to these embodiments the binding agent for deactivation of the enzyme comprises any one or combination of ethylenediaminetetraacetic acid (EDTA) and any salt thereof, (hydroxyethyl)ethylenediaminetriacetic acid (HEDTA) and any salt thereof, potassium tripolyphosphate (KTPP), a phosphonic acid and any salt thereof, nitrilotriacetic acid (NTA) and any salt thereof, diethylene triamine pentaacetic acid (DTPA) and any salt thereof, glutamic acid diacetic acid (GLDA) and any salt thereof, methylglycinediacetic acid (MGDA) and any salt thereof, iminodisuccinc acid (IDS) and any salt thereof, aminocarboxylic acids and any salt thereof, hydroxyethane diphosphonic acid (HEDP) and any salt thereof, amino tris (methylenephosphonic acid) (ATMP) and any salt thereof, 2-phosphonobutane-1,2,4-tricarboxylic acid (PBTC) and any salt thereof, ethylenediamine tetra(methylene phosphonic acid) (EDTMP) and any salt thereof, diethylenetriamine penta(methylene phosphonic acid) (DTPMP) and any salt thereof, a polyacrylate, an acrylic acid-maleic acid copolymer and any salt thereof, and any combination thereof. Further pursuant to this embodiment of the invention, a concentration of the binding agent for deactivation of the enzyme is from about 0.005 wt % to about 1 wt % based on the overall weight of the solution.

In certain embodiments of the inventions, a ratio by weight of the binding agent used for deactivation of the enzyme or the deactivation binding agent is at least about 0.2 g binding agent to gram of enzyme, preferably from about 0.2 to about 200 g binding agent per gram of enzyme, or, more preferably, from about 0.2 to about 80 g binding agent per gram of enzyme.

In some embodiments of the invention, the method of cleaning the membrane additionally comprises the step of adding a reducing agent for deactivation of the enzyme. Further pursuant to these embodiments, the reducing agent for deactivation of the enzyme comprises sodium dithionite. Further pursuant to this embodiment, wherein the sodium dithionite concentration is at least about 0.2 wt %, preferably, from about 0.25 wt % to about 10 wt %, or, more preferably, from about 0.25 wt % to about 2.5 wt %.

In certain embodiments of the invention, optionally, a pH of the solution is increased and/or a temperature of the solution is increased to reduce the activity of the enzyme. Further pursuant to this embodiment, the pH may be increased to from about 11 to about 13 depending on membrane tolerance. Still further pursuant to this embodiment, the temperature may be increased to from about 50° C. to about 85° C. Yet further pursuant to this embodiment, the pH may be increased to from about 12.0 to about 13.0 while the temperature may increased to from about 50° C. to about 60° C. Still yet further pursuant to this embodiment, the pH may be increased to from about 11.0 to about 12.0 while the temperature may be increased to from about 60° C. to about 85° C.

In an embodiment of the invention, the membrane has been used for the treatment of proteins. In particular, according to certain embodiments of the invention, the membrane has been used for the treatment of one of acid whey, sweet whey and skim milk.

In another aspect, the invention provides a method of cleaning a membrane comprising pre-rinsing with a pre-rinse solution comprising water for a period of from about 2 minutes to about 30 minutes, cleaning the membrane using a solution comprising an enzyme and an agent having a pH compatible with the enzyme for a period of from about 2 minutes to about 45 minutes and preventing any divalent ions in the solution from precipitation, reducing an activity of the enzyme by adding at least one of a binding agent and a reducing agent, optionally, reducing an activity of the enzyme comprises increasing at least one of a pH of the solution and a temperature of the solution, following the adding and optional increasing step continuing to wash the membrane on the order of up to about 40 minutes, and post-rinsing with a post-rinse solution comprising water for a period of from about 2 minutes to about 30 minutes.

Other aspects and embodiments will become apparent upon review of the following description. The invention, though, is pointed out with particularity by the included claims.

BRIEF DESCRIPTION OF THE DRAWINGS

Figure 1:
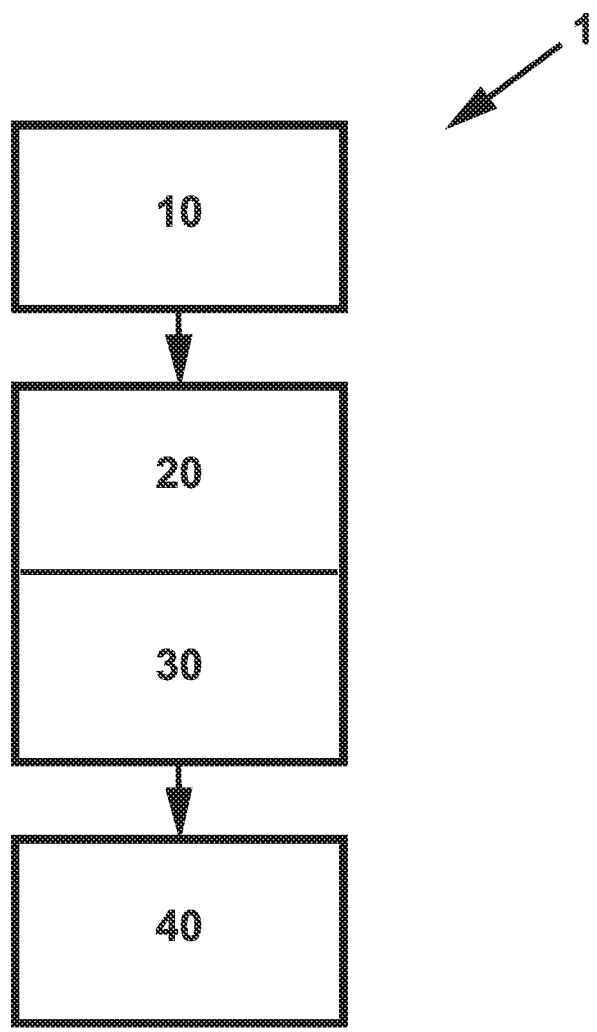
Figure 2:
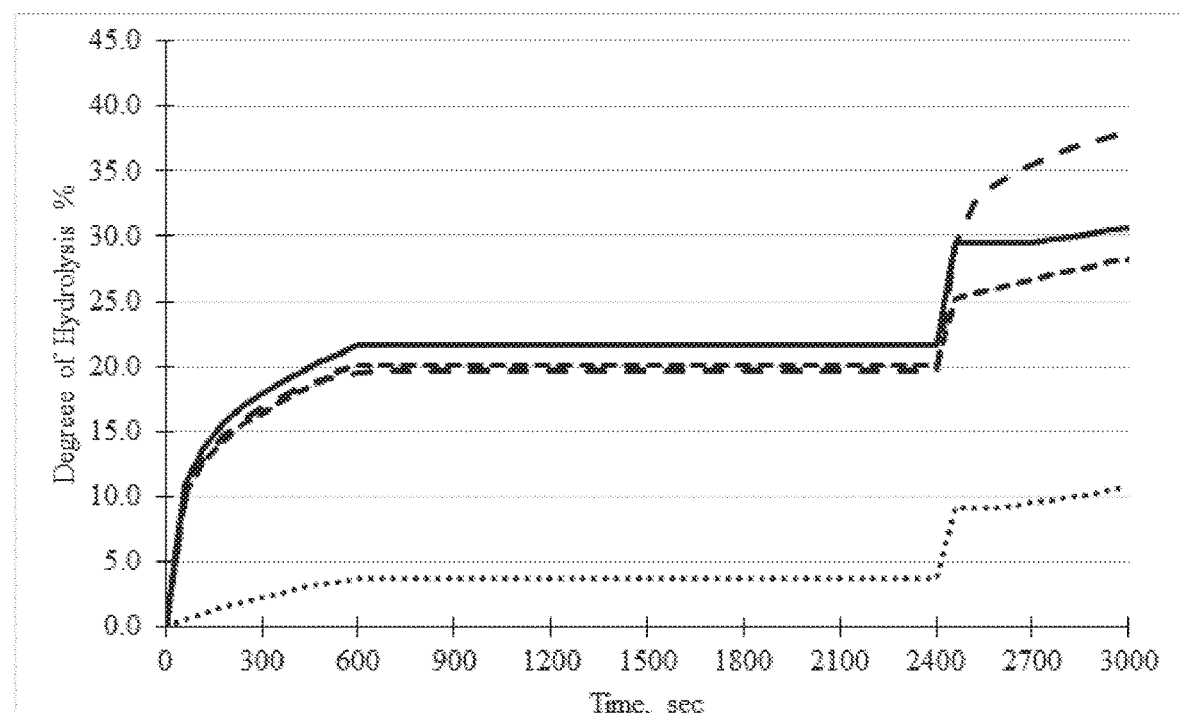
Figure 3:
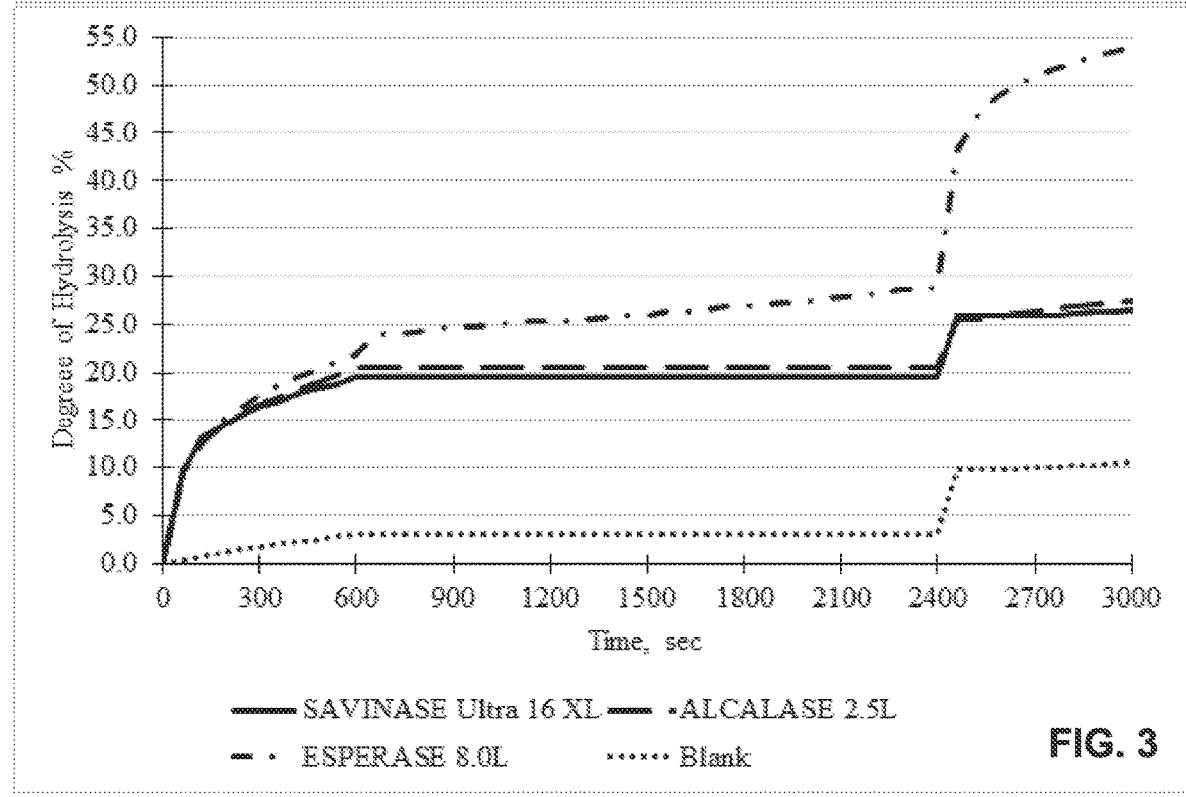
Figure 4:
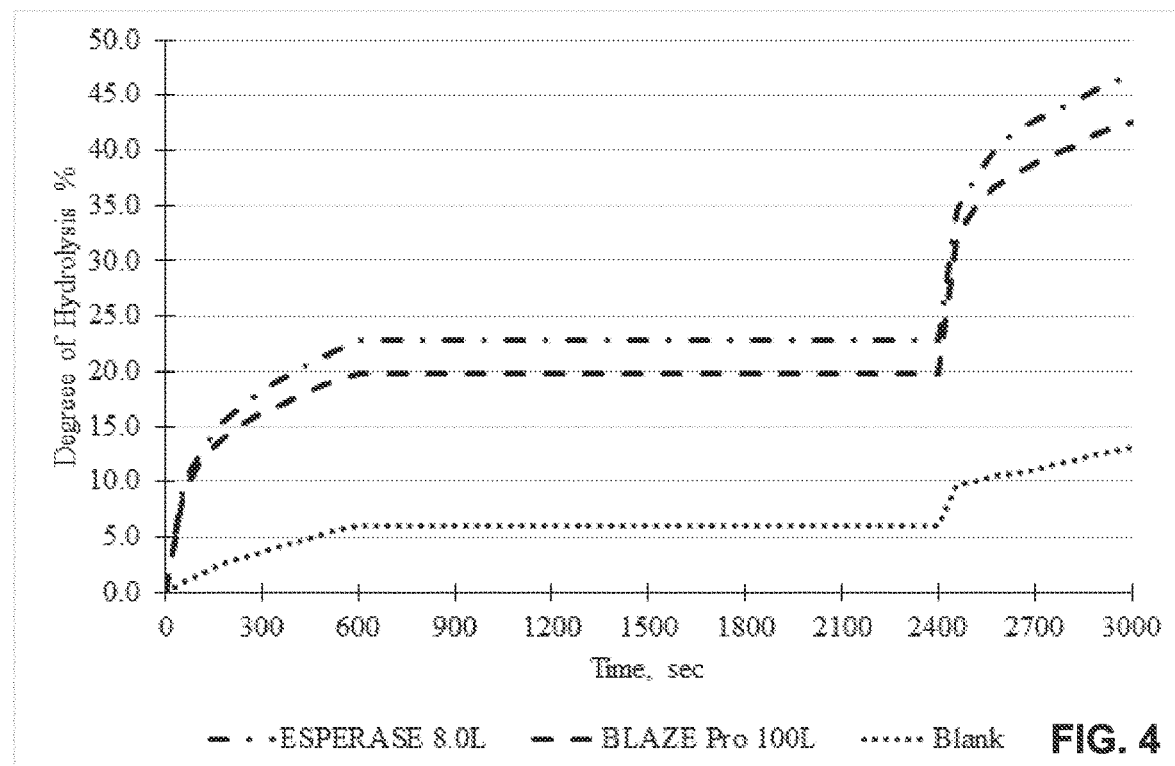
Figure 5:
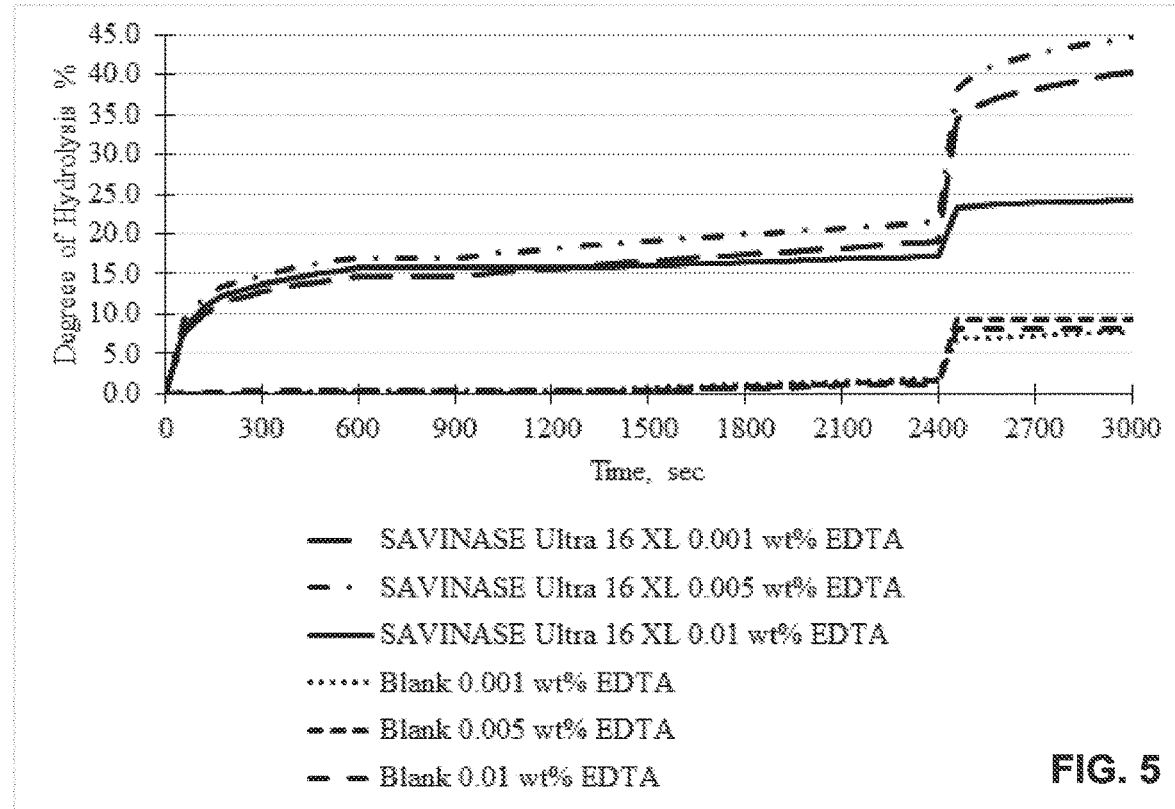
Figure 6:
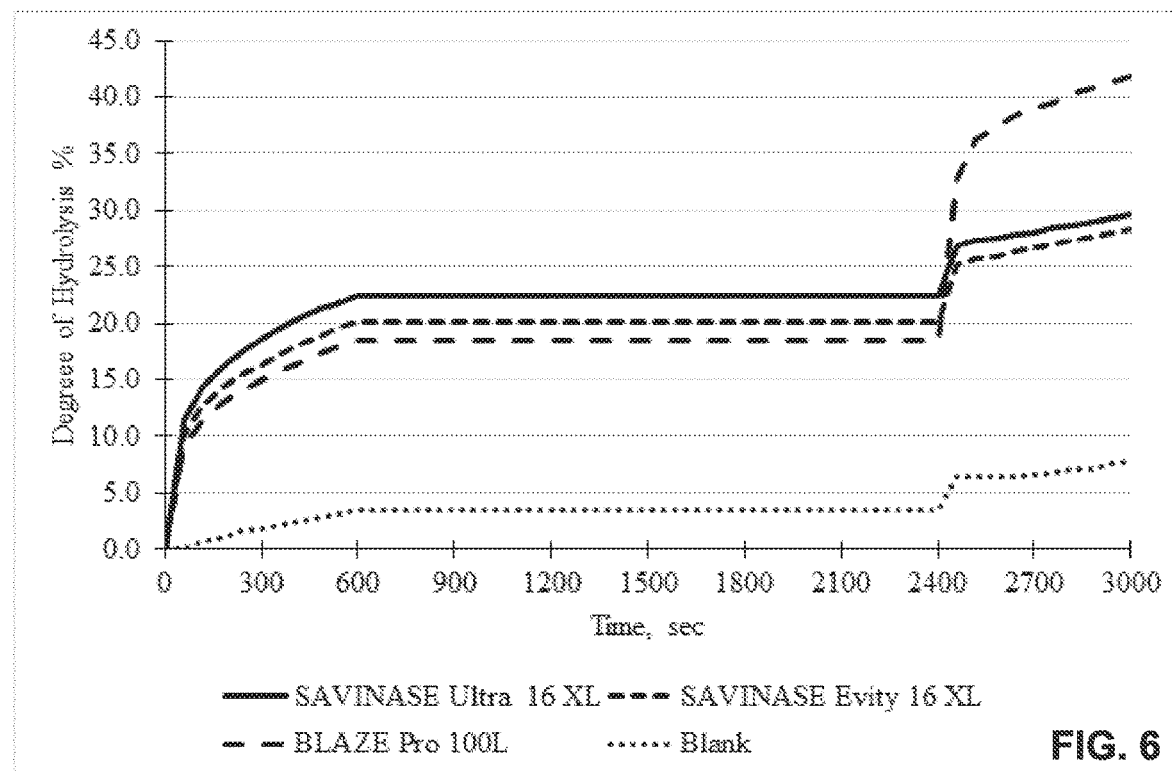
Figure 7:
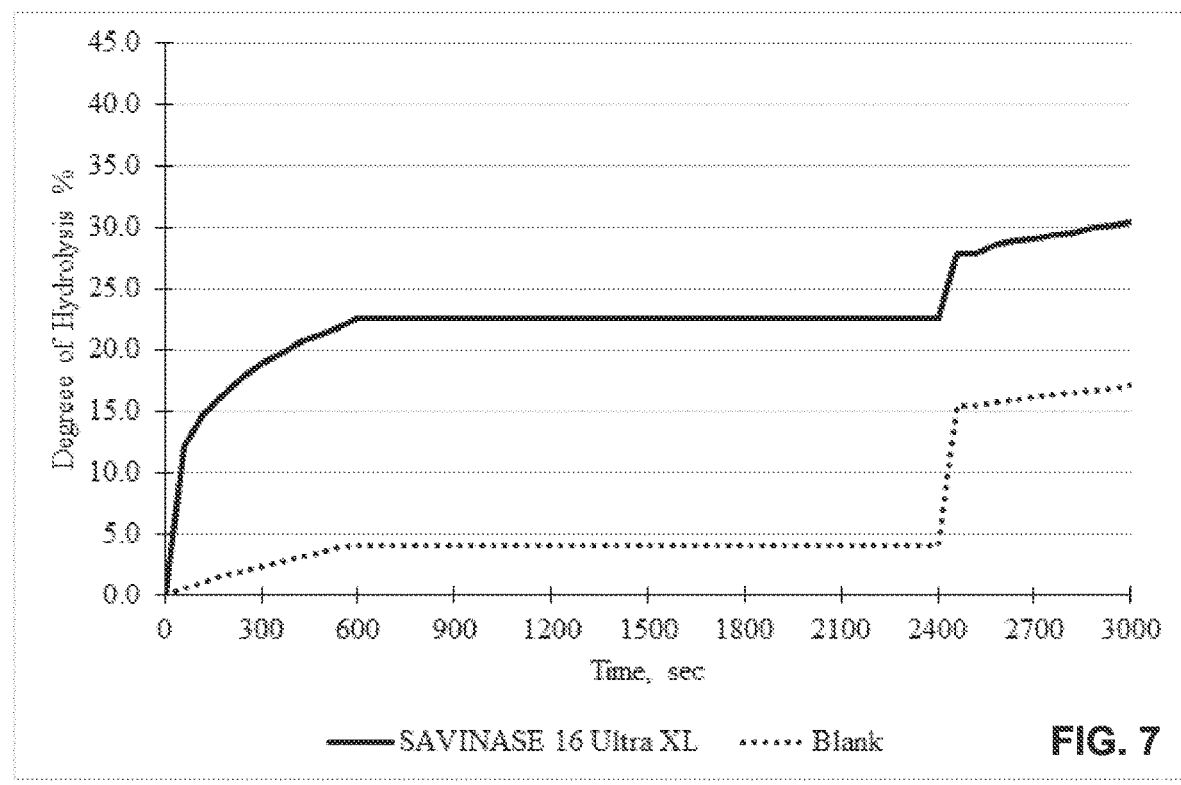
Figure 8:
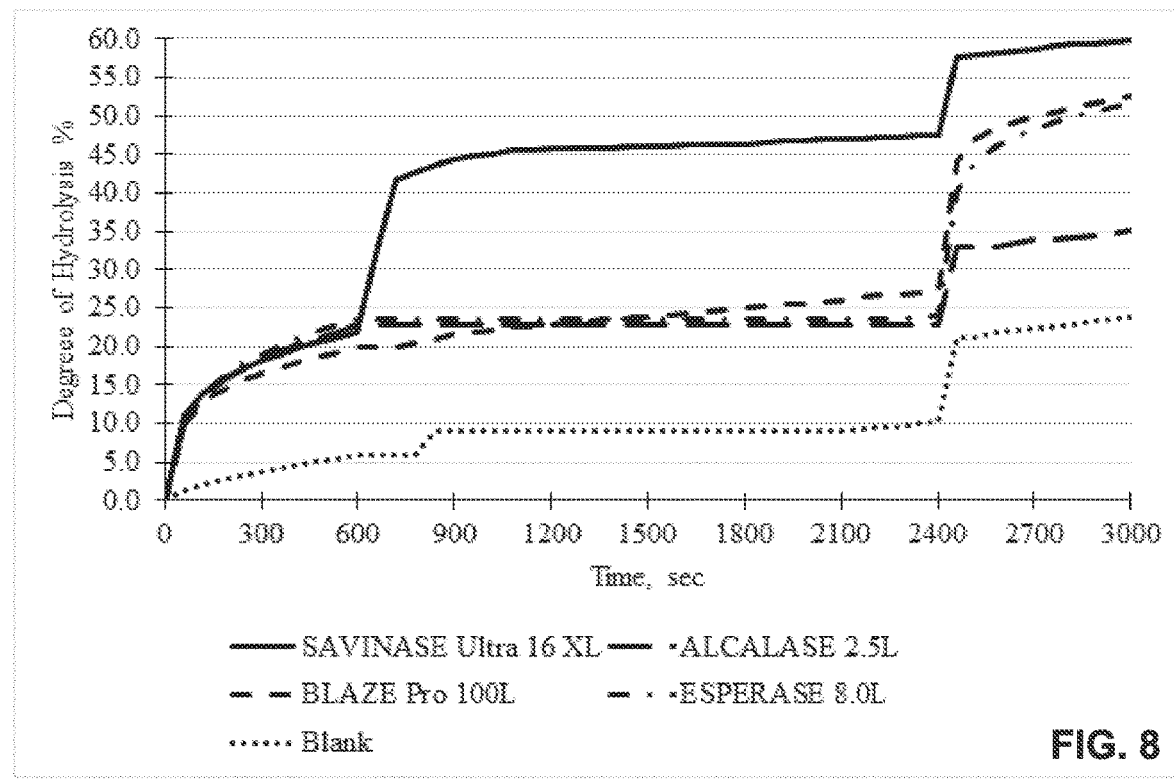
Figure 9:
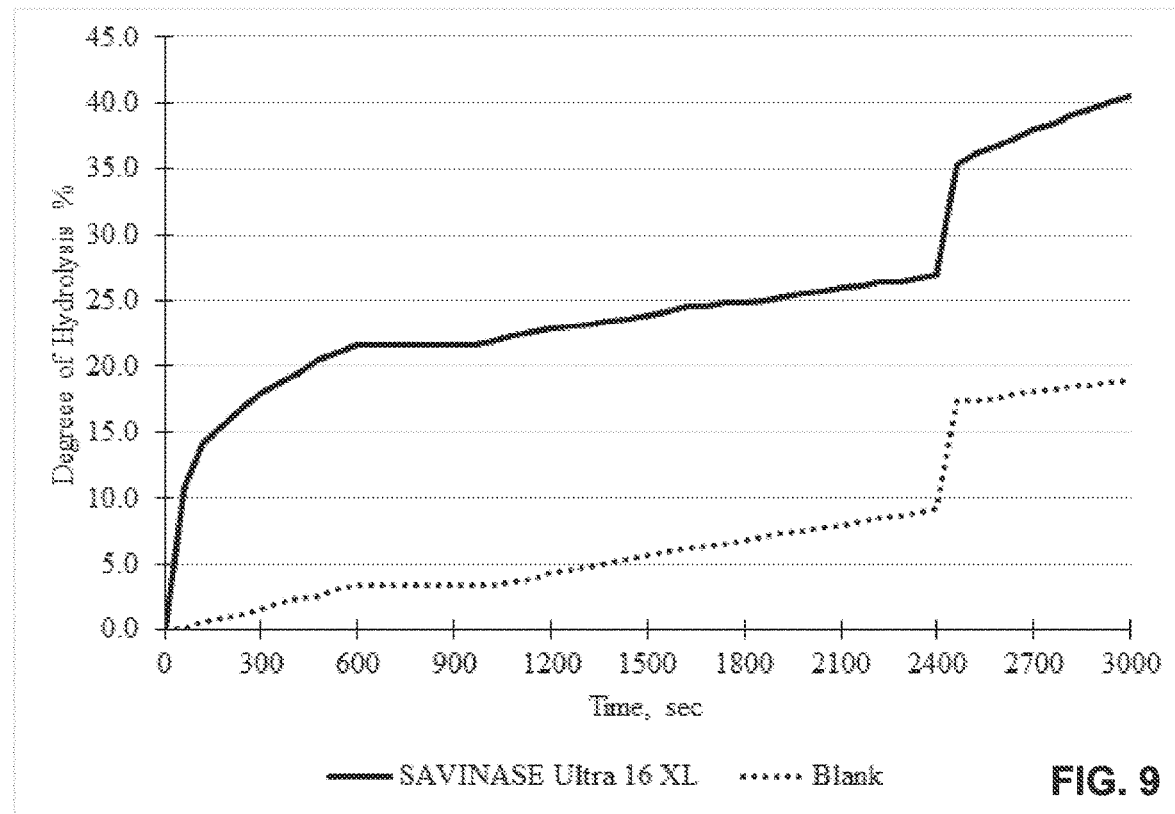

Having thus described the invention in general terms, reference will now be made to the accompanying drawings, which are not necessarily drawn to scale, and wherein:

FIG. 1 is a flowchart showing the steps in a method of cleaning a membrane according to an embodiment of the invention;

FIG. 2 is a graphical representation of the variation in the degree of hydrolysis for sweet whey powder in enzyme substrate solutions dosed with 0.5 wt % EDTA as the binding agent;

FIG. 3 is a graphical representation of the variation in the degree of hydrolysis for sweet whey powder in enzyme substrate solutions dosed with 0.125 wt % EDTA as the binding agent;

FIG. 4 is a graphical representation of the variation in the degree of hydrolysis for sweet whey powder in enzyme substrate solutions dosed with 1.0 wt % EDTA as the binding agent;

FIG. 5 is a graphical representation of the variation in the degree of hydrolysis for sweet whey powder in enzyme substrate solutions dosed with 0.001 wt % EDTA, 0.005 wt % EDTA and 0.01 wt % EDTA as the binding agent;

FIG. 6 is a graphical representation of the variation in the degree of hydrolysis for sweet whey powder in enzyme substrate solutions dosed with 0.46 wt % MGDA as the binding agent;

FIG. 7 is a graphical representation of the variation in the degree of hydrolysis for sweet whey powder in enzyme substrate solutions dosed with 0.115 wt % MGDA as the binding agent;

FIG. 8 is a graphical representation of the variation in the degree of hydrolysis for sweet whey powder in enzyme substrate solutions dosed with 0.33 wt % HEDP as the binding agent; and FIG. 9 is a graphical representation of the variation in the degree of hydrolysis for sweet whey powder in an enzyme substrate solution dosed with 1.0 wt % polyacrylate as the binding agent.

DETAILED DESCRIPTION OF THE INVENTION

The present invention now will be described more fully hereinafter. Preferred embodiments of the invention may be described, but this invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments of the invention are not to be interpreted in any way as limiting the invention.

As used in the specification and in the appended claims, the singular forms "a", "an", and "the" include plural referents unless the context clearly indicates otherwise. For example, reference to "an enzyme" includes a plurality of such enzymes.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

As used herein, an "alkalinity agent" refers to a compound that increases the pH of solution.

As used herein, the term "buffer" means a compound that maintains the pH of the cleaning solution within a narrow range of limits. A buffer included in the cleaning solution of the invention maintains a pH in a desired range.

As used herein, a "binding agent" is a substance that binds with ions, preferably, bi-valent ions including, but not limited to, calcium and magnesium ions. In a preferred embodiment of the invention, the binding agent comprises a bi-valent binding agent. A binding agent may include, but is not limited to, chelates and sequestrants. A binding agent includes a compound capable of isolating or inactivating a metal ion that may be present in the solution by developing a complex that prevents the metal ion from readily participating in or catalyzing chemical reactions. The terms "chelant", "chelating agent" or "sequestrant" may also be used interchangeably with the term "binding agent" in the disclosure provided herein. A binding agent, chelant, chelating agent or sequestrant complex may prevent certain metal ions from precipitating on the membrane surface and blocking the pores of the membrane. For example, water present in the equipment for cleaning purposes may include calcium cations ($Ca^{2+}$) and magnesium cations ($Mg^{2+}$) that determine the hardness of the water. A binding agent may be included that complex with $Ca^{2+}$ and $Mg^{2+}$ metal ions to prevent the precipitation of such compounds as phosphates, sulfates or carbonates. In addition to a binding agent providing improved control of water hardness, a binding agent may assist with the control of dissolved free fatty acids from saponified fats by preventing the build-up of Ca- or Mg- soaps. In a non-limiting example, sodium stearate is soluble in water that will cause the stearate to remain in the solution. However, upon saponification, calcium stearate may instead be formed, which is largely insoluble in water and cannot be rinsed from the solution causing. Thus a binding agent avoids such formation of calcium stearate.

As used herein, the term "enzyme" may catalyze the breakdown of proteinaceous materials and/or organic soil that have become deposited on the surface of equipment. It is not favored to use any such enzymes at higher temperatures-typically above 60° C.—since enzymes are susceptible to breakdown at these higher temperatures. It is more preferable to use enzymes for cleaning, even more preferably, in the range of from about 40° C. to about 50° C. Proteases (break down protein), amylases (break down starch) and lipases (break down fats) are the most commonly used types of enzymes in cleaning systems.

A protease (also called a peptidase or proteinase) is any enzyme that performs proteolysis; protein catabolism by hydrolysis of peptide bonds. Proteases have evolved multiple times, and different classes of protease can perform the same reaction by completely different catalytic mechanisms. Proteases can be found in animalia, plantae, fungi, bacteria, archaea and viruses. Generally, proteases are classified in several broad groups by the catalytic types including, but not limited to, serine, cysteine, aspartic, and metallo proteases (zinc).

An up-to-date classification of protease evolutionary super families is found in the MEROPS database (see http://merops.sanger.ac.uk/). In this database, proteases are classified firstly by 'clan' (superfamily) based on structure, mechanism and catalytic residue order. Currently more than 50 clans are known, each indicating an independent evolutionary origin of proteolysis.

The native 3D structure of enzymes is stabilized by various effects, e.g. by mono- and divalent ions, disulfid bonds, hydrogen bonds and hydrophobic interaction. Depending on the specific 3D structure and stabilization, thereof, there are several inactivation steps applicable. Hydrogen bonds and hydrophobic interactions can be influenced by an increase of pH and temperature for all proteases, but the acceptable band of pH and temperature can be limited by the equipment material in the membrane plant and therefore this method cannot always be used in membrane cleaning applications.

As used herein, the term "reducing agent" or "enzyme reducing agent" refers to a compound or mixture of compounds that are capable of reducing the activity of the enzyme. In a non-limiting example, an enzyme reducing agent is capable of unfolding the proteins by breaking down there structure. For example, an enzyme reducing agent may deactivate an enzyme by breaking down the disulfide bonds. Such agents include, but are not limited to, sodium sulfide, sodium borohydride, sodium dithionite, dithiothreitol, and glutathionine.

The application of reducing agents is limited to proteases stabilised by disulfid bonds. Many reducing agents are organosulfur compounds and even very small spillages can cause malodor, which tends not be desired in the processing of such enzymes.

A further differentiation can be done for the divalent ion stabilized proteases, which can be deactivated in most cases with the application of divalent ion binding agents (like chelating agents, chelates, sequestering agents, phosphonic acids and salts thereof, and polyacrylates). Commercial examples of this type of enzyme are SAVINASE® or ALCALASE® each available from Novozymes (headquartered in Bagsvaerd, Denmark). In the case that the protease is not sensitive to divalent binding agents, such as BLAZE® Pro 100L or ESPERASE®, because the divalent ion can be bound very strong to the enzyme, the enzyme has to be deactivated by one of the first two methods (inactivation by the exposure to reducing agents to reduce the disulfide bonds, application of extreme pH or an increase of temperature to disturb the hydrophobic interactions).

Calcium, in a non-limiting example, is essential for the stability of an enzyme. Some enzyme types have the Ca-ion very strongly bound in their structure, whereas other enzymes may more easily release the Ca-ion into the surrounded water. In case there is no water hardness present, there can be an equilibrium between the Ca-ion in the enzyme structure and its release to the water phase. The "free available" Ca-ion in the water phase can be bound to a binding agent, a chelate, phosphonate or any combination of these substances. The enzyme can be deactivated by releasing its Ca-ion in an environment where there is no Ca-ion present. The released Ca-ion is then bound stronger to for example a chelate. As a result there is no available free Ca-ion to stabilize the enzyme and the enzyme does not remain active. With the pH-stat method the enzyme activity can be indirectly measured. This method has been used to measure enzyme activity in the presence of a binding agent that includes, in non-limiting examples, chelates and phosphonates.

As used herein, the term "surfactant" means an active cleaning agent of a cleaning solution that may perform any combination of wetting and even penetrating the soil in the equipment to be cleaned, loosening deposited soils at the surface of the equipment, and emulsifying the soils to keep them suspended in solution for removal from the equipment. Surfactants tend to also reduce the surface tension in the cleaning solution. Surfactants may be selected that are polar or hydrophilic in nature, such as negatively charged or anionic surfactant. Surfactants may be selected that are non-polar or hydrophobic in nature, such as nonionic surfactants having no charge. Amphoteric surfactants that behaviors like anionic, cationic and nonionic surfactants, depending on pH, can also be used, although the use of cationic surfactants are less preferred according to certain embodiments of the invention. Conventionally, surfactants have been chosen in cleaning solutions for a particular temperature of use.

As used herein, "vol %" refers to the percentage of a named compound based upon the volume of the compound relative to total volume of the solution the compound is embodied within unless expressly provided otherwise.

As used herein, "wt %" refers to the percentage of a named compound based upon the weight of the compound relative to total weight of the solution the compound is embodied within unless expressly provided otherwise.

An aspect of the invention described herein relates to a cleaning solution for use in cleaning of membranes that has an enzyme and an agent, the agent providing proper pH control of the cleaning. The cleaning solution may additionally comprise a binding agent and/or a surfactant. In particular, the cleaning solutions of the invention are particularly useful in cleaning membranes when an elevated temperature and/or a higher pH is otherwise needed, in particular to eventually deactivate the enzyme. In an embodiment of the invention, the cleaning solution generally comprises an enzyme and an alkalinity agent.

In cleaning certain membranes, rigid limits exist on both the types of compounds that may be included in the cleaning solution as well as upper limits on temperature and/or pH. The cleaning solutions of the invention allows for these limitations to be met.

The control of ions subject to precipitation is also needed. In particular, such ions include calcium. In an embodiment of the invention, the cleaning solution comprises a binding agent that may include a chelating agent to prevent any divalent ions present in the solution from precipitation.

In an embodiment of the invention, the surfactant may be used as a booster or as part of an alkaline or acid cleaning composition. In certain embodiments of the invention, the surfactant can be used as a membrane cleaning adjuvant for improved removal of proteins, fat, and other soils from membranes. In certain other embodiments of the invention, the surfactant may be selected to improve the hydrophilicity properties of the membrane and improve processing permeation properties. In certain embodiments of the invention, the surfactant is chosen to provide good rinsing characteristics, low foaming, good soil removal or cleaning properties, biodegradability, and/or relatively low cost. Uses surfactants that cause membrane fouling as well as other issues with respect to membrane surfaces are not preferred. For example, certain cationic surfactants may often be associated with irreversible fouling of the membrane due to the inability to rinse or wash the surfactant from the surface. It is understood that the membrane has a negative surface charge and therefore a cationic surfactant becomes strongly attracted to the surface of the membrane and cannot be easily removed. Any residual surfactant on the surface acts as a foulant causing low production and water flux rates resulting in poor production performance.

In certain embodiments, surfactants are chosen that do not negatively impact the membrane surface such as, without intending to be limiting, an anionic surfactant that is not readily attracted to the surface of the membrane due to both the membrane and surfactant tending to be negatively charged. In certain embodiments of the invention, an anionic surfactant is chosen to improve the rinseability of the surfactant while allowing the surfactant to assist with cleaning fats and proteins due to its reduced surface tension.

Nonionic surfactants may be included in the cleaning solution, according to certain embodiments of the invention. A nonionic surfactant may be characterized as having positive properties such as degreasing, low foaming, wetting, and reducing surface tension. However, nonionic surfactants that may cause fouling problems to the membrane due to their general poor rinseability characteristics are not preferred. Nonionic surfactants are technically neutral molecules, but the predictability of whether or not they will perform well as a surfactant booster on a particular membrane type is less certain. Molecular weight, hydrophilic-lipophilic-balance branching, linearity, alcohol chain length, Draves wetting, and degree of ethoxylation alone do not adequately predict whether or not a nonionic surfactant will function well on a membrane. In addition, the membrane surface type such as polyethersulfone (PES), polyvinyldenedifluoride (PVDF) have different surface energies that also affect how a surfactant functions on the surface and how the foulant functions on the surface. The molecular weight cut-off or pore size of a particular membrane will also likely affect the functionality of a surfactant due to pore fouling, pore penetration for cleaning pores, membrane permeation exclusion due to branching and molecular weight, and ease of permeation due to linearity.

In certain embodiments of the invention, the surfactant comprises one or more anionic surfactants including any one or combination of alkyl (C12) benzene sulfonic acid Na-salt; alkyl (C12) benzene sulfonic acid, dodecylbenzensulfonic acid; alkane (C13-17) sulfonic acid Na-salt, secondary alkane sulfonate; 2-ethylhexylsulphate; cumene sulfonate; xylene sulfonate; alkylaryl alkoxy phosphate ester K-salt; alpha-olefin sulfonic acid Na-salt; and an alkyl ether carboxylic acid including, in non-limiting examples, an alkyl (C4-8) ether (5EO) carboxylic acid, an alkyl (C8) ether (5EO) carboxylic acid, an alkyl (C4) ether (6EO) carboxylic acid, and an alkyl (C8) ether (8EO) carboxylic acid. The anionic surfactants disclosed herein may be used in combination with any of the other surfactants disclosed herein, according to certain embodiments of the invention.

In certain embodiments of the invention, the surfactant comprises one or more nonionic surfactants including any one or combination of an amine oxides, such as, for example without intending to be limiting, an alkyl dimethyl amine oxide such as, in a nonlimiting example, an alkyl (C12-14) dimethyl amine oxide; a polyglucoside such as, in a non-limiting example, C10 polyglucoside; an alkylglucoside such as, in non-limiting examples, a C8 alkylglucoside; a tridecyl alcohol ethoxylate; a hexan-1-ol ethoxylate; a sophorolipid, which is a surface active glycolipid compound that may be synthesized from a non-pathogenic yeast species; a glycerophospholipid, which is a lecithin fat that can be found in many foods; and polyethylene glycol. Any of the nonionic surfactants disclosed herein may be used in combination with any of the other surfactants disclosed herein, according to certain embodiments of the invention.

In certain other embodiments of the invention, the nonionic surfactant may be generally characterized by the presence of an organic hydrophobic group and an organic hydrophilic group and may be produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. In certain embodiments of the invention, propylene glycol may be included in the cleaning solution. The cleaning solution may comprise a hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Useful nonionic Surfactants in the present invention may include condensation products of one mole of a saturated or unsaturated, straight or branched chain alcohol having from 6 to 24 carbon atoms with from 3 to 50 moles of ethylene oxide; polyethylene glycol esters, other alkanoic acid esters formed by reaction with glycerides, glycerin, and polyhydric (saccharide or sorbitan/sorbitol) alcohols; ethoxylated $C_6$-$C_{18}$ fatty alcohols and $C_6$-$C_{18}$ mixed ethoxylated and propoxylated fatty alcohol in particular those that are water soluble; $C_{10}$-$C_{18}$ ethoxylated fatty alcohols having a degree of ethoxylation of from about 3 to about 50, on average; nonionic alkylpolysaccharides that include a hydrophobic group containing from about 6 to about 30 carbon atoms and a polysaccharide, e.g., a polyglycoside, hydrophilic group containing from about 1.3 to 10 saccharide units, on average; a Guerbet alcohol ethoxylate of the formula $R^1$—$(OC_2H_4)_n$—(OH), wherein $R^1$ is a branched $C_9$-$C_{20}$ alkyl group and n is from about 2 to about 10; a Guerbet alcohol ethoxlyate of the formula $R^1$—$(OC_2H_4)_n$—(OH) where $R^1$ is a branched $C_{10}$ to $C_{18}$ alkyl group and n is from 5 to 10 or from 7 to 9. In certain embodiments of the invention, $R^1$ may be a $C_8$ to $C_{12}$ branched alkyl group and n is 2 to 4.

The surfactants of the cleaning solution may include alkane sulfonates having an alkane group with from about 6 to about 24 carbon atoms. In certain non-limiting examples, the alkane sulfonates that can include secondary alkane sulfonates such as sodium $C_{14}$-$C_{17}$ secondary alkyl sulfonate.

In certain embodiments of the invention, the surfactant comprises one or more amphoteric surfactants including any one or combination of alkyl (C12-14) dimethyl betaine; alkyl (C12-14) amino dipropionate mono Na-salt; alkyl (C8) amino dipropionate mono Na-salt; and cocoampho dipropionate Na-salt. The amphoteric surfactants disclosed herein may be used in combination with any of the other surfactants disclosed herein, according to certain embodiments of the invention.

While other functional compounds may be included in the cleaning solution, according to certain embodiments of the invention, the cleaning solution will at least comprise an enzyme and an agent having a pH compatible with the enzyme. In an embodiment of the invention, the cleaning solution may comprise from about 5 to about 1000 ppm, from about 10 to about 750 ppm, from about 25 to about 600 ppm or from about 50 to about 500 ppm of the enzyme. In a preferred embodiment of the invention, the cleaning solutions comprises a serine protease enzyme.

In certain embodiments of the invention, the cleaning solution includes an enzyme stabilization agent for stabilizing the enzymes in the solution. For example the stabilization agent may be a water-soluble agent that generates calcium and/or magnesium ions. Variation in the concentrations of such ions is possible depending on a multiple number of factors including the multiplicity, types and concentration of enzymes incorporated. In certain non-limiting examples, the enzyme stabilization agent may comprise calcium chloride dihydrate and/or sodium formate. Non-limiting examples of water-soluble calcium or magnesium salts that can be employed include calcium chloride, calcium hydroxide, calcium formate, calcium malate, calcium maleate, calcium hydroxide and calcium acetate. Calcium or magnesium salts corresponding to the salts identified may be useful as well. Without intending to be limiting, under certain circumstances increased levels of calcium and/or magnesium may be useful.

Under certain conditions, without intending to be limiting, calcium is essential for the stability of an enzyme. Some enzyme types allow the calcium ion to become very strongly bound to their structure. Other enzymes may more easily release the calcium ion into the surrounding water. Certainly, the multiplicity, concentration of enzymes, and other cleaning solution conditions may also impact the degree in which the calcium ions remain bound to the enzyme(s). In particular, when there is substantially a lack of water hardness present, there can be an equilibrium established between the calcium ions in the enzyme structure and the release of calcium ions to the water phase. The "freely available" calcium ions in the water phase can be bound to a binding agent that includes, in non-limiting examples, a chelate, phosphonate, gluconate or any combination of these substances or any substance that acts as a binding agent. In an embodiment of the invention, the enzyme can be deactivated by releasing the calcium ions bound to it in an environment where there is no calcium ions present. The release of calcium ions under this circumstance is when calcium ions become more strongly bound to a binding agent present in the cleaning solution. As a result there will not be any available free calcium ions to stabilize the enzyme and the enzyme will no longer be active.

In certain embodiments of the invention, the cleaning solution may comprise an alkalinity agent. In an embodiment of the invention, the cleaning solution may comprise from about 0.01 to about 2 wt %, from about 0.01 to about 1 wt %, or from about 0.01 to about 0.5 wt % or from about 0.01 to 0.2 wt % of the alkalinity agent. In certain embodiments of the invention, a sufficient amount of alkalinity agent is included to provide a pH of the cleaning solution in a range of from about 8.5 to about 12 or, preferably, from about 9 to about 11.

In other embodiments of the invention, the cleaning solution may comprise a buffer. In an embodiment of the invention, the cleaning solution may comprise from about 0.05 to about 1 wt %, from about 0.05 to about 0.8 wt %, from about 0.1 to about 0.5 wt % of the buffer. pH regulators that may be included in the cleaning solution include any one or more of potassium hydroxide (e.g., in the range of 4.5-6.5 wt %), sodium bicarbonate (e.g. in the range of 8-12 wt %) and sodium carbonate (e.g., in the range of 4-8 wt %).

In certain embodiments of the invention, the cleaning solution additionally comprises a binding agent. The cleaning solution may comprise from about 1 to about 500 ppm, from about 10 to about 500 ppm, from about 25 to about 300 ppm, or from about 50 to about 200 ppm of the binding agent, according to certain embodiments of the invention.

Non-limiting examples of binding agents that may be included in the cleaning solution of the invention are ethylenediaminetetraacetic acid (EDTA) and any salt thereof, (hydroxyethyl)ethylenediaminetriacetic acid (HEDTA) and any salt thereof, potassium tripolyphosphate (KTPP), a phosphonic acid and any salt thereof, nitrilotriacetic acid (NTA) and any salt thereof, diethylene triamine pentaacetic acid (DTPA) and any salt thereof, gluconic acid (GA) and any salt thereof, glutamic acid diacetic acid (GLDA) and any salt thereof, methylglycinediacetic acid (MGDA) and any salt thereof, iminodisuccinc acid (IDS) and any salt thereof, aminocarboxylic acids and any salt thereof, hydroxyethane diphosphonic acid (HEDP) and any salt thereof, aminotris (methylenephosphonic acid) (ATMP) and any salt thereof, 2-phosphonobutane-1,2,4-tricarboxylic acid (PBTC) and any salt thereof, ethylenediamine tetra(methylene phosphonic acid) (EDTMP) and any salt thereof, diethylenetriamine penta(methylene phosphonic acid) (DTPMP) and any salt thereof, a polyacrylate, sodium gluconate (Na-gluconate) and any combinations thereof. A partially neutralized polyacrylic acid (having an M in the range of about 2.5 k to about 5 k) may be included in the cleaning solution, according to an embodiment of the invention.

In certain other embodiments of the invention, the cleaning solution may comprise an alkyl polyglucoside, the alkyl group being from about $C_2$ to about $C_{18}$, from about $C_5$ to about $C_{12}$, or form about $C_8$ to about $C_{10}$. An alkyl sulfuric acid or any salt thereof may be included in the cleaning solution, according to certain embodiments of the invention. In certain embodiments of the invention, the surfactant may include 2-ethylhexyl sulphate, alkyl (C 8) amino dipropionate mono Na-salt, C10 polyglucoside, alkyl (C12) benzene sulphonic acid Na-salt, and any combination thereof and in any combination with the other surfactants that are disclosed herein.

In other embodiments of the invention, the cleaning solution additionally comprises a surfactant. In an embodiment of the invention, the cleaning solution may comprise from about 1 to about 2000 ppm, from about 25 to about 1000 ppm, from about 50 to about 750 ppm, or, preferably, from about 150 to about 1000 ppm of the surfactant.

An aspect of the invention provides the use of the cleaning solution of the invention in cleaning a membrane. FIG. 1 is a flowchart showing the steps in a method of cleaning a membrane according to an embodiment of the invention. The method of cleaning a membrane 1 includes the steps of pre-rinsing the membrane 10. The pre-rinse time may endure between about 2 min to about 30 min.

Another step in cleaning the membrane 1 includes cleaning the membrane using a solution comprising an enzyme and an agent having a pH compatible with the enzyme and preventing any divalent ions in the solution from precipitation 20. A cleaning solution, containing an enzyme and an agent having a pH compatible with the membrane and a temperature compatible with the membrane is configured. This cleaning step may endure between about 2 min to about 45 min.

Another step in cleaning the membrane 1 includes reducing an activity of the enzyme 30. As further described herein, reducing the activity of the enzyme 30 may include any one or more of adding a binding agent, adding a reducing agent, increasing the pH and increasing the temperature. Without intending to be bound by theory, any pH and temperature increases for reducing the activity of the enzyme 30 are limited by what the membrane is capable of enduring. Additionally, the membrane must be compatible with any binding agent and/or reducing agent used. The reducing the activity of the enzyme 30 may endure up to about 45 min.

Another step in cleaning the membrane 1 includes post-rinsing the membrane for removal of the solution 40. The post-rinse time may endure between about 2 min to about 30 min.

In an embodiment of the invention, a method of cleaning a membrane includes the steps of pre-rinsing the membrane; cleaning the membrane using a solution comprising an enzyme and an agent having a pH compatible with the enzyme, the composition having a temperature compatible with the membrane; preventing any divalent ions in the solution from precipitation; reducing the enzyme activity; and post-rinsing the membrane for removal of the solution. In certain embodiments of the invention, the solution may additionally comprise at least one of a binding agent and a surfactant.

In an embodiment of the invention, the method of cleaning the membrane may additionally include the step of adding a binding agent for deactivation of the enzyme. In certain embodiments of the invention, the step for reducing the enzyme activity includes adding a reducing agent. In yet another embodiment of the invention, the step for reducing the enzyme may include one or both of increasing a pH and increasing a temperature of the solution.

Preferably, enough binding agent will be used to deactivate the enzyme after it performs its desired function in the cleaning operation. In an embodiment of the invention, the binding agent that is added to the cleaning solution may comprise from about 1 to about 6000 ppm, from about 5 to about 2000 ppm, or from about 10 to about 500 ppm of the solution. For calcium salts removal, the cleaning solution may comprise from about 1 to about 4000 ppm of additional binding agent. Non-limiting examples of the binding agent that may be added include ethylenediaminetetraacetic acid (EDTA) and any salt thereof, (hydroxyethyl)ethylenediaminetriacetic acid (HEDTA) and any salt thereof, potassium-tripolyphosphate (KTPP), a phosphonic acid and any salt thereof, nitrilotriacetic acid (NTA) and any salt thereof, diethylene triamine pentaacetic acid (DTPA) and any salt thereof, glutamic acid diacetic acid (GLDA) and any salt thereof, methylglycinediacetic acid (MGDA) and any salt thereof, iminodisuccinc acid (IDS) and any salt thereof, aminocarboxylic acids and any salt thereof, hydroxyethane diphosphonic acid (HEDP) and any salt thereof, aminotris (methylenephosphonic acid) (ATMP) and any salt thereof, 2-phosphonobutane-1,2,4-tricarboxylic acid (PBTC) and any salt thereof, ethylenediamine tetra(methylene phosphonic acid) (EDTMP) and any salt thereof, diethylenetriamine penta(methylene phosphonic acid) (DTPMP) and any salt thereof, a polyacrylate, an acrylic acid-maleic acid copolymer and any salt thereof, and any combinations thereof.

In an embodiment of the invention, the total amount of binding agent relative to the enzyme content is at least about 0.2 g binding agent/g enzyme present in solution, from about 0.2 g binding agent/g enzyme present in solution to about 200 g binding agent/g enzyme present in solution, or from about 0.2 g binding agent/g enzyme present in solution to about 80 g binding agent/g enzyme present in solution. In certain embodiments of the invention, the binding 1 agent comprises EDTA and the cleaning solution comprises from about 0.2 g EDTA/g enzyme present in solution to about 80 g EDTA/g enzyme present in solution, from about 0.2 g EDTA/g enzyme present in solution to about 60 g EDTA/g enzyme present in solution, or from about 0.2 g EDTA/g enzyme present in solution to about 40 g EDTA/g enzyme present in solution.

In certain other embodiments of the invention, the binding agent comprises MGDA and the cleaning solution comprises from about 0.2 g MGDA/g enzyme present in solution to about 100 g MGDA/g enzyme present in solution, from about 0.2 g MGDA/g enzyme present in solution to about 80 g MGDA/g enzyme present in solution, or from about 0.5 g MGDA/g enzyme present in solution to about 60 g MGDA/g enzyme present in solution.

In an embodiment of the invention, the pH of the solution at the cleaning step may be from about 2.0 to about 11.0, from about 7.0 to about 11.0, from about 8 to about 11, or from about 8.5 to about 10.5. In certain embodiments of the invention, the temperature of the solution at the cleaning step may be from about 10° C. to about 70° C., from about 30° C. to about 50° C., less than about 60° C., or less than about 50° C.

In an embodiment of the invention, the solution contacts the membrane for about 2 to about 90 minutes, from about 10 minutes to about 60 minutes, or from about 10 minutes to about 45 minutes. In an embodiment of the invention the reduction in enzyme activity may be due, at least in part, to the addition of at least one of the binding agent and the reducing agent.

In certain embodiments of the invention, the pH may be increased to from about 10.5 to about 13.5, from about 8.5 to about 13.0, from about 11.0 to about 12.0, or from about 12.0 to about 13.0. In other embodiments of the invention, the temperature may be increased to less than about 55° C., less than about 70° C., less than about 75° C. or less than about 80° C. In certain embodiments of the invention the temperature is increased to from about 50° C. to about 70° C., from about 50° C. to about 60° C., from about 60° C. to about 85° C., or from about 60° C. to about 70° C.

In certain embodiments of the invention, the pH is increased to from about 8.5 to about 13.5 and the temperature is increased to from about 50° C. to about 85° C. or from about 50° C. to about 70° C. In certain other embodiments of the invention, the pH is increased to from about 8.5 to about 13.5 and the temperature is increased to from about 50° C. to about 60° C. In yet other embodiments of the invention, the pH is increased to from about 8.5 to about 13.0 and the temperature is increased to from about 50° C. to about 70° C. In still yet other embodiments of the invention, the pH is increased to from about 8.5 to about 13.0 and the temperature is increased to from about 60° C. to about 85° C. or from about 60° C. to about 70° C. In yet other embodiments of the invention, the pH is increased to about 8.5 to about 11.5 and the temperature is increased to about 50° C. following which a reducing agent is then added to reduce the enzyme activity.

In an embodiment of the invention, an activity of the enzyme is attenuated by at least about 50%, at least about 60%, at least about 70%, at least about 80%, at least about 85%, at least about 90%, or at least about 95%. In certain embodiments of the invention, the activity of the enzyme may be reduced by increasing at least one of the pH or the temperature of the solution from about 2 minutes to about 45 minutes, from about 5 minutes to about 30 minutes, or from about 10 minutes to about 20 minutes. In certain embodiments of the invention, the activity of the enzyme is reduced by increasing at least one of the pH or the temperature of the solution for about 15 minutes.

The method of cleaning the membrane may comprise adding an alkalinity agent to the solution that contacts the membrane prior to adding the binding agent to reduce the activity of the enzyme.

In an embodiment of the invention, the method of cleaning the membrane is performed without rinsing the solution from the membrane between the time the cleaning solution is contacted with the membrane to the time used for reducing the activity of the enzyme.

An embodiment of the invention, a method is provided for cleaning a membrane used for the treatment of any soluble proteinaceous soil that includes the following steps: pre-rinsing with a pre-rinse solution comprising water for a period of from about 2 minutes to about 30 minutes; cleaning the membrane using a solution comprising an enzyme and an agent having a pH compatible with the enzyme according to the definition of solution and cleaning step as further defined herein for a period of from about 2 minutes to about 45 minutes; adding one or both of a binding agent and a reducing agent optionally including increasing at least one of a pH and a temperature of the solution; following the adding and optional increasing step continuing to wash the membrane on the order of up to about 45 minutes; and post-rinsing with a post-rinse solution comprising water for a period of from about 2 minutes to about 30 minutes.

Enzyme activity in a solution can be indirectly measured using a pH-stat method. The pH-stat method may be used to measure enzyme activity in the presence of a binding agent that includes, in non-limiting examples, chelates, phosphonate and gluconate. The action of protease on proteins creates acid functional groups. Therefore, the hydrolysis of proteins reduces the pH of the solution over time. The extent of release of amino acids during the enzymatic breakdown may be measured by the amount of caustic needed to keep the pH of the solution constant. Furthermore, without intending to be bound by theory, it is preferred to maintain the pH at a value where the enzyme activity is at its maximum. Additionally, temperature in combination with the pH needs to be maintained at a preferred value to maximize the activity of the enzyme.

The degree of hydrolysis is identified by the following equation:

$$DH\ \% = \frac{V \times N}{M \times \alpha \times h_{tot}} \times 100 \quad (1)$$

Where:
DH %=degree of hydrolysis, %
V=volume of NaOH added, mL
N=molarity of the NaOH solution, mol/L
M=total protein mass, g
α=average degree of dissociation of α-amino groups released during the hydrolysis
$h_{tot}$=total number of peptide bonds, mmol/g

EXAMPLES

The invention is further defined by reference to the following examples, which describe cleaning solutions and methods for performing an accelerated cleaning of a dairy-based membrane operation according to the invention and the performance of such in a membrane cleaning operation.

Example 1

Inactivation tests for different enzymes were performed using colorimetric analysis to determine enzyme activity. A standard solution of 0.5 wt % buffer having a pH of 9.53 was initially formulated. Separate enzyme solutions were formed using this standard solution. Varying concentrations of sodium hydroxide (NaOH) were added to adjust to pH of the solution to the desired level. Table 1 identifies the enzyme solutions that were formulated using the protease enzymes ALCALASE® 2.5L, ESPERASE® 8.0L, SAVINASE® Ultra 16 XL and BLAZE® Pro 100L, all suitable for the hydrolysis of proteins each available from Novozymes (headquartered in Bagsvaerd, Denmark).

TABLE 1

Cleaning Solutions Having 0.5 wt % Buffer with Varying Types of Enzymes

| Cleaning Solution | Enzyme Name | Concentration wt % | NaOH, wt % | pH |
|---|---|---|---|---|
| 1 | ESPERASE 8.0L | 0.3 | 0.000 | 9.50 |
| 2 | | | 0.050 | 11.20 |
| 3 | | | 0.125 | 12.00 |
| 4 | | | 0.625 | 12.80 |
| 5 | ALCALASE 2.5L | 0.3 | 0.000 | 9.49 |
| 6 | | | 0.050 | 11.36 |
| 7 | | | 0.125 | 12.01 |
| 8 | | | 0.625 | 12.80 |
| 9 | SAVINASE Ultra 16 XL | 0.3 | 0.000 | 9.51 |
| 10 | | | 0.050 | 11.32 |
| 11 | | | 0.125 | 12.01 |
| 12 | | | 0.625 | 12.79 |
| 13 | BLAZE Pro 100L | 0.3 | 0.000 | 10.85 |
| 14 | | | 0.050 | 11.95 |
| 15 | | | 0.625 | 12.84 |

Table 2 shows the enzyme activities of the solutions identified in Table 1 at varying temperatures. Those solutions marked with 100% indicate an enzyme activity that is greater than an upper detection limit of the measurement method, while those marked with u.d. identifies an enzyme activity that is less than the detection limit of the measurement method.

TABLE 2

Enzyme Activities at Various Temperatures

| Cleaning Solution | Enzyme Activity | | |
|---|---|---|---|
| | 50° C. | 60° C. | 70° C. |
| 1 | 100% | 100% | 100% |
| 2 | 100% | 100% | u.d. |
| 3 | 100% | u.d. | u.d. |
| 4 | u.d. | u.d. | u.d. |
| 5 | 100% | 100% | <8% |
| 6 | 100% | <65% | u.d. |
| 7 | u.d. | u.d. | u.d. |
| 8 | u.d. | u.d. | u.d. |
| 9 | 100% | 100% | u.d. |
| 10 | 100% | u.d. | u.d. |
| 11 | u.d. | u.d. | u.d. |
| 12 | u.d. | u.d. | u.d. |
| 13 | 100% | <30% | u.d. |
| 14 | <20% | u.d. | u.d. |
| 15 | u.d. | u.d. | u.d. |

Table 3A identifies a series of cleaning solutions having 0.5 wt % of a buffer and 0.2 wt % ESPERASE 8.0L. The enzyme activity of the cleaning solution at varying concentrations of the enzyme reducing agent sodium dithionite ($Na_2S_2O_4$) at various dilution levels were measured with these results shown in Table 3A as well. Those solutions marked with o.d indicate an enzyme activity that is over a detection limit of the measurement method, while those marked with u.d. identifies an enzyme activity that is under the detection limit of the measurement method.

TABLE 3A

Effect of Enzyme Reducing Agent Concentration and Dilution on Enzyme Activity

| Concentration, wt % | | | | |
|---|---|---|---|---|
| Buffer | ESPERASE 8.0L | $Na_2S_2O_4$ | Solution Dilution | Enzyme Activity |
| 0.5 | 0.0 | 0.00 | 0 | u.d. |
| 0.5 | 0.0 | 0.05 | 0 | u.d. |
| 0.5 | 0.0 | 0.10 | 0 | u.d. |
| 0.5 | 0.0 | 0.15 | 0 | u.d. |
| 0.5 | 0.0 | 0.20 | 0 | u.d. |
| 0.5 | 0.0 | 0.25 | 0 | u.d. |
| 0.5 | 0.2 | 0.00 | 0 | o.d. |
| 0.5 | 0.2 | 0.05 | 0 | o.d. |
| 0.5 | 0.2 | 0.10 | 0 | o.d. |
| 0.5 | 0.2 | 0.15 | 0 | o.d. |
| 0.5 | 0.2 | 0.20 | 0 | o.d. |
| 0.5 | 0.2 | 0.25 | 0 | u.d. |
| 0.5 | 0.2 | 0.00 | 5X | o.d. |
| 0.5 | 0.2 | 0.05 | 5X | o.d. |
| 0.5 | 0.2 | 0.10 | 5X | o.d. |
| 0.5 | 0.2 | 0.15 | 5X | o.d. |
| 0.5 | 0.2 | 0.20 | 5X | 0.22794 |
| 0.5 | 0.2 | 0.25 | 5X | u.d. |
| 0.5 | 0.2 | 0.00 | 10X | 0.93602 |
| 0.5 | 0.2 | 0.05 | 10X | 0.81721 |
| 0.5 | 0.2 | 0.10 | 10X | 0.71910 |
| 0.5 | 0.2 | 0.15 | 10X | 0.65791 |
| 0.5 | 0.2 | 0.20 | 10X | 0.21666 |
| 0.5 | 0.2 | 0.25 | 10X | u.d. |

Similar tests were conducted for a series of cleaning solutions having 0.5 wt % of a buffer and 0.5 wt % BLAZE Pro 100L whose results are included in Table 3B.

TABLE 3B

Effect of Enzyme Reducing Agent Concentration and Dilution on Enzyme Activity

| Concentration, wt % | | | Solution | Enzyme |
|---|---|---|---|---|
| Buffer | BLAZE Pro 100L | $Na_2S_2O_4$ | Dilution | Activity |
| 0.5 | 0.2 | 0.00 | 0 | 0.75783 |
| 0.5 | 0.2 | 0.05 | 0 | 0.70535 |

TABLE 3B-continued

Effect of Enzyme Reducing Agent Concentration and Dilution on Enzyme Activity

| Concentration, wt % | | | Solution | Enzyme |
|---|---|---|---|---|
| Buffer | BLAZE Pro 100L | $Na_2S_2O_4$ | Dilution | Activity |
| 0.5 | 0.2 | 0.10 | 0 | 0.69190 |
| 0.5 | 0.2 | 0.15 | 0 | 0.65687 |
| 0.5 | 0.2 | 0.20 | 0 | 0.63666 |
| 0.5 | 0.2 | 0.25 | 0 | 0.62515 |

The tests in Tables 3A and 3B show that a sodium dithionite concentration of 0.25 wt % deactivates ESPERASE 8.0L, but not BLAZE Pro 100L with a contact time of five minutes at 50° C.

Example 2

Investigations concerning which binding agent—e.g., EDTA, KTPP, IDS, PBTC or ATMP and eventually the sodium carbonate buffer system itself, as non-limiting exemplary binding agents—has the highest impact on decreasing enzyme activity in the use solution, tests were conducted by mixing different binding agents together with the enzyme ESPERASE 8.0L or ALCALASE 2.5L type DX belonging to the class of serine proteases or, to be more precise, to the class of the subtilases.

Cleaning solutions were prepared in reverse osmosis (RO) water without the enzyme and heated to 50° C. The pH of the cleaning solution was adjusted to 9.0 and the enzyme addition followed. The temperature of the cleaning solution was maintained at 50° C. for 60 minutes. Two samples of the cleaning solution were taken when the enzyme was added and at the following intervals after the enzyme was added: 10 minutes, 20 minutes, 30 minutes and 60 minutes. Upon being taken, the samples were immediately placed in an ice bath to quench further reaction and the enzyme activity of the samples were measured. Table 4 identifies the cleaning solutions that were tested that included caustic, a surfactant, a buffer and the protease enzyme ESPERASE 8.0L.

TABLE 4

| | Cleaning Solution | | | | | | | | | |
|---|---|---|---|---|---|---|---|---|---|---|
| | 16 | 17 | 18 | 19 | 20 | 21 | 22 | 23 | 24 | 25 |
| Compound | Concentration, wt % | | | | | | | | | |
| water (soft) | 99.54 | 99.60 | 99.63 | 99.52 | 99.51 | 99.58 | 99.56 | 99.53 | 99.56 | 99.50 |
| potassium hydroxide | 0.0800 | 0.0841 | 0.0841 | 0.0841 | 0.0858 | 0.0858 | 0.0858 | 0.0858 | 0.0858 | 0.0858 |
| phosphoric acid | 0.0416 | 0.0416 | 0.0416 | 0.0416 | 0.0416 | 0.0416 | 0.0416 | 0.0416 | 0.0416 | 0.0446 |
| 1,2-benzisothiazolin-3-one Na-salt | 0.00013 | 0.00013 | 0.00013 | 0.00013 | 0 | 0 | 0 | 0 | 0 | 0 |
| 2-phosphonobutane, 1,2,4-tricarboxylic acid—PBTC | 0.0033 | 0.0033 | 0.0033 | 0.0033 | 0 | 0 | 0 | 0 | 0 | 0 |
| sodium carbonate—$Na_2CO_3$ | 0.033 | 0.033 | 0 | 0.0198 | 0.0198 | 0.0198 | 0 | 0.0198 | 0.0198 | 0.0198 |
| sodium bicarbonate—$NaHCO_3$ | 0 | 0 | 0 | 0.033 | 0.033 | 0.033 | 0 | 0.033 | 0.033 | 0.033 |
| ethylene diamine tetraacetic acid—EDTA | 0.0588 | 0 | 0 | 0.0588 | 0.0157 | 0 | 0.0157 | 0 | 0.0157 | 0 |
| iminodisuccinic acid Na-salt—IDS | 0 | 0 | 0 | 0 | 0 | 0 | 0 | 0 | 0 | 0.0224 |
| potassium triphosphate—KTPP | 0 | 0 | 0 | 0 | 0.0495 | 0 | 0.0495 | 0.0495 | 0 | 0.0495 |
| aminotrimethylene phosphonic acid—ATMP | 0 | 0 | 0 | 0 | 0.0033 | 0.0033 | 0.0033 | 0.0033 | 0.0033 | 0.0033 |
| propylene glycol | 0.1400 | 0.1400 | 0.1400 | 0.1400 | 0.1400 | 0.1400 | 0.1400 | 0.1400 | 0.1400 | 0.1400 |
| alkyl (C12-14) dimethyl betaine | 0.0758 | 0.0758 | 0.0758 | 0.0758 | 0.0758 | 0.0758 | 0.0758 | 0.0758 | 0.0758 | 0.0758 |
| sulphuric acid | 0.0004 | 0.0004 | 0.0004 | 0.0004 | 0.0004 | 0.0004 | 0.0004 | 0.0004 | 0.0004 | 0.0004 |
| ESPERASE 8.0L | 0.0250 | 0.0250 | 0.0250 | 0.0250 | 0.0250 | 0.0250 | 0.0250 | 0.0250 | 0.0250 | 0.0250 |
| pH | 9.01 | 8.96 | 9.06 | 9.00 | 9.04 | 9.06 | 9.03 | 9.03 | 9.06 | 9.06 |

Table 5 shows the relative activity of the ESPERASE 8.0L after just being added to the cleaning solution, 20 minutes after addition and 60 minutes after addition. Note that * means without buffer.

TABLE 5

| | | Relative ESPERASE 8.0L Activity, % | | |
|---|---|---|---|---|
| Cleaning Solution | Binding Agent | After Addition | After 20 min | After 60 min |
| 16 | 0.0588% EDTA + 0.0033% PBTC | 100 | 89 | 80 |
| 17 | 0.0033% PBTC | 100 | 98 | 100 |
| 18 | 0.0033% PBTC* | 100 | 100 | 95 |
| 19 | 0.0588% EDTA + 0.0033% PBTC | 100 | 96 | 88 |
| 20 | 0.0157% EDTA + 0.0495% KTPP + 0.0033% ATMP | 100 | 65 | 59 |
| 21 | 0.0033% ATMP | 100 | 98 | 101 |
| 22 | 0.0157% EDTA + 0.0495% KTPP + 0.0033% ATMP* | 100 | 91 | 80 |
| 23 | 0.0495% KTPP + 0.0033% ATMP | 100 | 101 | 100 |
| 24 | 0.0157% EDTA + 0.0033% ATMP | 100 | 63 | 54 |
| 25 | 0.0224% IDS + 0.0495% KTPP + 0.0033% ATMP | 100 | 96 | 88 |

As shown in Table 5, the greatest reduction in activity of ESPERASE 8.0L after 60 minutes was achieved with cleaning solution 24 (63% relative activity after 20 minutes and 54% relative activity after 60 minutes), which used a binding agent combination of 0.0157 wt % EDTA+0.0033 wt % ATMP, followed by cleaning solution 20 (65% relative activity after 20 minutes and 59% relative activity after 60 minutes), which used a binding agent combination of 0.0157 wt % EDTA+0.0495 wt % KTPP+0.0033 wt % ATMP.

Table 6 identifies the cleaning solutions that were tested that included caustic, a buffer and the protease enzyme ALCALASE 2.5L.

cleaning solution 32 (35% relative activity after 20 minutes and 3% relative activity after 60 minutes), which used a complexing combination of 0.0157 wt % EDTA+0.0495 wt % KTPP+0.0033 wt % ATMP, followed by cleaning solution 30 (39% relative activity after 20 minutes and 10% relative activity after 60 minutes), which used a binding agent combination of 0.0157 wt % EDTA+0.0495 wt % KTPP+0.0033 wt % ATMP.

TABLE 6

| Compound | Cleaning Solution | | | | | | | | | |
|---|---|---|---|---|---|---|---|---|---|---|
| | 26 | 27 | 28 | 29 | 30 | 31 | 32 | 33 | 34 | 35 |
| | Concentration, wt % | | | | | | | | | |
| water (soft) | 99.70 | 99.76 | 99.79 | 99.68 | 99.67 | 99.74 | 99.72 | 99.69 | 99.72 | 99.66 |
| potassium hydroxide | 0.0800 | 0.0841 | 0.0841 | 0.0841 | 0.0858 | 0.0858 | 0.0858 | 0.0858 | 0.0858 | 0.0858 |
| phosphoric acid | 0.0416 | 0.0416 | 0.0416 | 0.0416 | 0.0416 | 0.0416 | 0.0416 | 0.0416 | 0.0416 | 0.0446 |
| 1,2-benzisothiazolin-3-one Na-salt | 0.00013 | 0.00013 | 0.00013 | 0.00013 | 0 | 0 | 0 | 0 | 0 | 0 |
| 2-phosphonobutane, 1,2,4-tricarboxylic acid—PBTC | 0.0033 | 0.0033 | 0.0033 | 0.0033 | 0 | 0 | 0 | 0 | 0 | 0 |
| sodium carbonate—$Na_2CO_3$ | 0.033 | 0.033 | 0 | 0.0198 | 0.0198 | 0.0198 | 0 | 0.0198 | 0.0198 | 0.0198 |
| sodium bicarbonate—$NaHCO_3$ | 0 | 0 | 0 | 0.033 | 0.033 | 0.033 | 0 | 0.033 | 0.033 | 0.033 |
| ethylene diamine tetraacetic acid—EDTA | 0.0588 | 0 | 0 | 0.0588 | 0.0157 | 0 | 0.0157 | 0 | 0.0157 | 0 |
| iminodisuccinic acid Na-salt—IDS | 0 | 0 | 0 | 0 | 0 | 0 | 0 | 0 | 0 | 0.0224 |
| potassium triphosphate—KTPP | 0 | 0 | 0 | 0 | 0.0495 | 0 | 0.0495 | 0.0495 | 0 | 0.0495 |
| aminotrimethylene phosphonic acid—ATMP | 0 | 0 | 0 | 0 | 0.0033 | 0.0033 | 0.0033 | 0.0033 | 0.0033 | 0.0033 |
| propylene glycol | 0.0500 | 0.0500 | 0.0500 | 0.0500 | 0.0500 | 0.0500 | 0.0500 | 0.0500 | 0.0500 | 0.0500 |
| 1,2-benzisothiazolin-3-one Na-salt | 0.0002 | 0.0002 | 0.0002 | 0.0002 | 0.0002 | 0.0002 | 0.0002 | 0.0002 | 0.0002 | 0.0002 |
| calcium chloride | 0.0025 | 0.0025 | 0.0025 | 0.0025 | 0.0025 | 0.0025 | 0.0025 | 0.0025 | 0.0025 | 0.0025 |
| ALCALASE 2.5L type DX | 0.0268 | 0.0268 | 0.0268 | 0.0268 | 0.0268 | 0.0268 | 0.0268 | 0.0268 | 0.0268 | 0.0268 |
| pH | 8.97 | 9.09 | 9.04 | 9.07 | 9.03 | 9.03 | 9.02 | 9.06 | 9.02 | 9.05 |

Table 7 shows the relative activity of the ALCALASE 2.5L after just being added to the cleaning solution, 20 minutes after addition and 60 minutes after addition. Note that * means without buffer.

TABLE 7

| Cleaning Solution | Binding Agent | Relative ALCALASE 2.5L Activity, % | | |
|---|---|---|---|---|
| | | After Addition | After 20 min | After 60 min |
| 26 | 0.0588% EDTA + 0.0033% PBTC | 100 | 57 | 16 |
| 27 | 0.0033% PBTC | 100 | 95 | 84 |
| 28 | 0.0033% PBTC* | 100 | 76 | 55 |
| 29 | 0.0588% EDTA + 0.0033% PBTC | 100 | 61 | 35 |
| 30 | 0.0157% EDTA + 0.0495% KTPP + 0.0033% ATMP | 100 | 39 | 10 |
| 31 | 0.0033% ATMP | 100 | 94 | 88 |
| 32 | 0.0157% EDTA + 0.0495% KTPP + 0.0033% ATMP* | 100 | 35 | 3 |
| 33 | 0.0495% KTPP + 0.0033% ATMP | 100 | 68 | 38 |
| 34 | 0.0157% EDTA + 0.0033% ATMP | 100 | 63 | 15 |
| 35 | 0.0224% IDS + 0.0495% KTPP + 0.0033% ATMP | 100 | 87 | 52 |

As shown in Table 7, the greatest reduction in activity of ALCALASE 2.5L after 60 minutes was achieved with Example 3

A series of tests on multiple different types of enzymes using an assortment of binding agents were performed. The protease enzymes used in these tests were ALCALASE® 2.5L, ESPERASE® 8.0L, SAVINASE® Ultra 16 XL, SAVINASE® Evity 16 XL, and BLAZE® Pro 100L each available from Novozymes (headquartered in Bagsvaerd, Denmark). The binding agents tested were salts of EDTA, MGDA NTA, GLDA, HEDTA, DTPA, gluconate, KTPP, ATMP, PBTC, HEDP, EDTMP, DTPMP and polyacrylate.

100 ml substrate solutions were prepared having a sweet whey concentration of 0.25 vol % in soft water based on the overall volume of the solution. This was achieved by adding about 0.9588 g of an 80% sweet whey powder solution having a density of 0.3084 g/ml to 1 L of soft water. The solution was heated to 50° C. and the pH of the solution was adjusted to 10. 0.3 ml of enzyme solution having an enzyme concentration of 5 vol % was added to the heated/pH adjusted substrate solution. This combined solution was then titrated with 0.1M NaOH to maintain the pH at 10 over the course of 10 minutes. The binding agent was then added and mixed with the solution over the course of 30 minutes while still maintaining the pH at 10. About 0.09588 g of fresh whey powder solution was then added to 100 ml of the solution, and the solution was titrated with 0.1M NaOH to maintain the pH at 10 over the course of 10 minutes.

The $h_{tot}$ value for whey protein concentrate is 8.8 and the $1/\alpha$ value at 50° C. and a pH of 10 is 1. The degree of hydrolysis, DH %, was calculated over the course of the enzyme addition, binding agent addition, and the fresh enzyme addition. As the data shows, the DH % first rapidly increases followed by a slower increase over time. Simultaneously, the caustic also reacts with the substrate. The effect of this degree of reaction is measured using a "blank" solution, which is free of any enzyme.

After addition of the binding agents, depending upon the substance, either attenuates or terminates any change in DH %. After fresh substrate is added, either the enzyme continues to work and follows a similar reaction rate as experienced in the start of the experiment or is deactivated whereby any change in hydrolysis is primarily the result of only the caustic reacting with the substrate.

Tables 8A, 8B and 8C provide the variation in the DH % for sweet whey powder for varying concentrations of EDTA-Na salt as the binding agent dosed to the corresponding named enzyme substrate solutions at a pH of 10 and 50° C.

TABLE 8A

| | Binding Agent | | | | | |
|---|---|---|---|---|---|---|
| | 0.001 wt % EDTA | | 0.005 wt % EDTA | | 0.01 wt % EDTA | |
| | Enzyme | | | | | |
| Time, s | SAVINASE Ultra 16 XL | Blank | SAVINASE Ultra 16 XL | Blank | SAVINASE Ultra 16 XL | Blank |
| | Degree of Hydrolysis, % | | | | | |
| 0 | 0.00 | 0.00 | 0.0 | 0.0 | 0.00 | 0.00 |
| 60 | 7.56 | 0.00 | 9.3 | 0.0 | 8.21 | 0.12 |
| 120 | 9.97 | 0.00 | 12.0 | 0.0 | 10.95 | 0.25 |
| 180 | 11.49 | 0.00 | 13.4 | 0.0 | 12.25 | 0.28 |
| 240 | 12.10 | 0.00 | 14.2 | 0.0 | 13.03 | 0.31 |
| 300 | 12.68 | 0.00 | 14.8 | 0.0 | 13.74 | 0.31 |
| 360 | 13.23 | 0.00 | 15.4 | 0.0 | 14.26 | 0.31 |
| 420 | 13.71 | 0.13 | 15.9 | 0.0 | 14.61 | 0.31 |
| 480 | 13.96 | 0.31 | 16.4 | 0.0 | 15.08 | 0.31 |
| 540 | 14.45 | 0.43 | 16.7 | 0.0 | 15.38 | 0.31 |
| 600 | 14.67 | 0.53 | 17.0 | 0.0 | 15.79 | 0.31 |
| 660 | 14.67 | 0.53 | 17.0 | 0.0 | 15.79 | 0.31 |
| 720 | 14.67 | 0.53 | 17.0 | 0.0 | 15.79 | 0.31 |
| 780 | 14.67 | 0.53 | 17.0 | 0.0 | 15.79 | 0.31 |
| 840 | 14.67 | 0.53 | 17.0 | 0.0 | 15.79 | 0.31 |

TABLE 8A-continued

| | Binding Agent | | | | | |
|---|---|---|---|---|---|---|
| | 0.001 wt % EDTA | | 0.005 wt % EDTA | | 0.01 wt % EDTA | |
| | Enzyme | | | | | |
| Time, s | SAVINASE Ultra 16 XL | Blank | SAVINASE Ultra 16 XL | Blank | SAVINASE Ultra 16 XL | Blank |
| | Degree of Hydrolysis, % | | | | | |
| 900 | 14.67 | 0.53 | 17.0 | 0.0 | 15.79 | 0.31 |
| 960 | 14.89 | 0.53 | 17.3 | 0.0 | 15.79 | 0.31 |
| 1020 | 15.10 | 0.53 | 17.6 | 0.0 | 15.79 | 0.31 |
| 1080 | 15.32 | 0.53 | 17.8 | 0.0 | 15.79 | 0.31 |
| 1140 | 15.47 | 0.53 | 18.0 | 0.0 | 15.79 | 0.31 |
| 1200 | 15.54 | 0.53 | 18.1 | 0.0 | 15.79 | 0.31 |
| 1260 | 15.76 | 0.53 | 18.3 | 0.3 | 15.79 | 0.31 |
| 1320 | 15.95 | 0.53 | 18.6 | 0.3 | 15.79 | 0.31 |
| 1380 | 16.16 | 0.53 | 18.7 | 0.3 | 15.84 | 0.41 |
| 1440 | 16.38 | 0.68 | 19.0 | 0.3 | 15.98 | 0.41 |
| 1500 | 16.59 | 0.68 | 19.1 | 0.5 | 15.98 | 0.41 |
| 1560 | 16.81 | 0.83 | 19.3 | 0.5 | 16.12 | 0.52 |
| 1620 | 17.01 | 0.83 | 19.4 | 0.7 | 16.23 | 0.52 |
| 1680 | 17.19 | 0.94 | 19.6 | 0.7 | 16.23 | 0.72 |
| 1740 | 17.25 | 1.05 | 19.8 | 0.7 | 16.35 | 0.72 |
| 1800 | 17.44 | 1.05 | 19.9 | 1.0 | 16.44 | 0.72 |
| 1860 | 17.65 | 1.15 | 20.1 | 1.0 | 16.47 | 0.72 |
| 1920 | 17.74 | 1.30 | 20.3 | 1.0 | 16.54 | 0.74 |
| 1980 | 17.86 | 1.30 | 20.4 | 1.2 | 16.66 | 0.83 |
| 2040 | 18.02 | 1.37 | 20.5 | 1.2 | 16.78 | 0.83 |
| 2100 | 18.19 | 1.50 | 20.7 | 1.2 | 16.93 | 1.00 |
| 2160 | 18.37 | 1.50 | 20.9 | 1.4 | 16.93 | 1.00 |
| 2220 | 18.53 | 1.59 | 21.0 | 1.4 | 17.06 | 1.00 |
| 2280 | 18.74 | 1.71 | 21.2 | 1.4 | 17.06 | 1.00 |
| 2340 | 18.74 | 1.71 | 21.4 | 1.6 | 17.12 | 1.08 |
| 2400 | 18.95 | 1.80 | 21.6 | 1.6 | 17.22 | 1.22 |
| 2460 | 34.52 | 6.92 | 38.2 | 9.3 | 23.34 | 8.17 |
| 2520 | 36.12 | 6.93 | 40.2 | 9.3 | 23.46 | 8.17 |
| 2580 | 36.96 | 7.05 | 41.2 | 9.3 | 23.61 | 8.17 |
| 2640 | 37.75 | 7.17 | 42.0 | 9.3 | 23.66 | 8.17 |
| 2700 | 38.26 | 7.21 | 42.5 | 9.3 | 23.84 | 8.17 |
| 2760 | 38.72 | 7.30 | 43.0 | 9.3 | 23.84 | 8.17 |
| 2820 | 39.13 | 7.43 | 43.4 | 9.3 | 23.97 | 8.17 |
| 2880 | 39.54 | 7.56 | 43.9 | 9.3 | 24.06 | 8.17 |
| 2940 | 39.99 | 7.56 | 44.3 | 9.3 | 24.17 | 8.17 |
| 3000 | 40.24 | 7.68 | 44.7 | 9.3 | 24.30 | 8.17 |

TABLE 8B

| | Binding Agent | | | | | |
|---|---|---|---|---|---|---|
| | 0.125 wt % EDTA | | | | 0.25 wt % EDTA | |
| | Enzyme | | | | | |
| Time, s | SAVINASE Ultra 16 XL | ALCALASE 2.5L | ESPERASE 8.0L | Blank | SAVINASE Ultra 16 XL | Blank |
| | Degree of Hydrolysis, % | | | | | |
| 0 | 0.00 | 0.00 | 0.00 | 0.00 | 0.00 | 0.00 |
| 60 | 9.74 | 9.59 | 9.22 | 0.28 | 11.61 | 1.30 |
| 120 | 13.09 | 12.46 | 12.87 | 0.75 | 14.78 | 2.37 |
| 180 | 14.27 | 14.24 | 14.95 | 1.11 | 16.62 | 3.24 |
| 240 | 15.47 | 15.67 | 16.26 | 1.54 | 18.09 | 3.93 |
| 300 | 16.34 | 16.57 | 17.66 | 1.75 | 19.18 | 4.56 |
| 360 | 16.92 | 17.40 | 18.68 | 2.12 | 20.18 | 5.16 |
| 420 | 17.79 | 18.24 | 19.56 | 2.32 | 21.15 | 5.64 |
| 480 | 18.30 | 18.88 | 20.38 | 2.50 | 21.85 | 6.19 |
| 540 | 18.81 | 19.64 | 21.17 | 2.89 | 22.50 | 6.67 |
| 600 | 19.48 | 20.55 | 21.84 | 3.09 | 23.27 | 7.04 |
| 660 | 19.48 | 20.55 | 23.91 | 3.09 | 23.29 | 7.04 |
| 720 | 19.48 | 20.55 | 23.91 | 3.09 | 23.29 | 7.04 |
| 780 | 19.48 | 20.55 | 24.24 | 3.09 | 23.29 | 7.04 |
| 840 | 19.48 | 20.55 | 24.50 | 3.09 | 23.29 | 7.04 |
| 900 | 19.48 | 20.55 | 24.70 | 3.09 | 23.29 | 7.04 |
| 960 | 19.48 | 20.55 | 24.70 | 3.09 | 23.29 | 7.04 |
| 1020 | 19.48 | 20.55 | 24.91 | 3.09 | 23.29 | 7.04 |
| 1080 | 19.48 | 20.55 | 25.10 | 3.09 | 23.29 | 7.04 |
| 1140 | 19.48 | 20.55 | 25.30 | 3.09 | 23.29 | 7.04 |

TABLE 8B-continued

| | Binding Agent | | | | | |
|---|---|---|---|---|---|---|
| | 0.125 wt % EDTA | | | | 0.25 wt % EDTA | |
| | Enzyme | | | | | |
| Time, s | SAVINASE Ultra 16 XL | ALCALASE 2.5L | ESPERASE 8.0L | Blank | SAVINASE Ultra 16 XL | Blank |
| | Degree of Hydrolysis, % | | | | | |
| 1200 | 19.48 | 20.55 | 25.30 | 3.09 | 23.29 | 7.04 |
| 1260 | 19.48 | 20.55 | 25.42 | 3.09 | 23.29 | 7.04 |
| 1320 | 19.48 | 20.55 | 25.62 | 3.09 | 23.29 | 7.04 |
| 1380 | 19.48 | 20.55 | 25.82 | 3.09 | 23.29 | 7.04 |
| 1440 | 19.48 | 20.55 | 25.99 | 3.09 | 23.29 | 7.04 |
| 1500 | 19.48 | 20.55 | 26.01 | 3.09 | 23.29 | 7.04 |
| 1560 | 19.48 | 20.55 | 26.22 | 3.09 | 23.29 | 7.04 |
| 1620 | 19.48 | 20.55 | 26.35 | 3.09 | 23.29 | 7.04 |
| 1680 | 19.48 | 20.55 | 26.58 | 3.09 | 23.29 | 7.04 |
| 1740 | 19.48 | 20.55 | 26.82 | 3.09 | 23.29 | 7.04 |
| 1800 | 19.48 | 20.55 | 26.82 | 3.09 | 23.29 | 7.04 |
| 1860 | 19.48 | 20.55 | 27.07 | 3.09 | 23.29 | 7.04 |
| 1920 | 19.48 | 20.55 | 27.36 | 3.09 | 23.29 | 7.04 |
| 1980 | 19.48 | 20.55 | 27.36 | 3.09 | 23.29 | 7.04 |
| 2040 | 19.48 | 20.55 | 27.57 | 3.09 | 23.29 | 7.04 |
| 2100 | 19.48 | 20.55 | 27.83 | 3.09 | 23.29 | 7.04 |
| 2160 | 19.48 | 20.55 | 28.12 | 3.09 | 23.29 | 7.04 |
| 2220 | 19.48 | 20.55 | 28.32 | 3.09 | 23.29 | 7.04 |
| 2280 | 19.48 | 20.55 | 28.56 | 3.09 | 23.29 | 7.04 |
| 2340 | 19.48 | 20.55 | 28.65 | 3.09 | 23.29 | 7.04 |
| 2400 | 19.48 | 20.55 | 28.91 | 3.09 | 23.29 | 7.04 |
| 2460 | 25.86 | 25.50 | 43.22 | 9.90 | 25.17 | 12.35 |
| 2520 | 25.86 | 25.50 | 46.70 | 9.90 | 25.17 | 12.35 |
| 2580 | 25.86 | 25.80 | 48.79 | 9.90 | 25.17 | 12.35 |
| 2640 | 25.86 | 26.05 | 49.96 | 9.90 | 25.38 | 12.56 |
| 2700 | 25.86 | 26.34 | 50.90 | 10.10 | 25.60 | 12.77 |
| 2760 | 25.95 | 26.61 | 51.77 | 10.12 | 25.66 | 12.98 |
| 2820 | 26.07 | 26.80 | 52.33 | 10.27 | 25.91 | 13.29 |
| 2880 | 26.33 | 27.00 | 52.99 | 10.27 | 26.04 | 13.60 |
| 2940 | 26.33 | 27.31 | 53.52 | 10.42 | 26.32 | 13.82 |
| 3000 | 26.54 | 27.51 | 54.04 | 10.58 | 26.60 | 14.07 |

TABLE 8C

| | Binding Agent | | | | | | |
|---|---|---|---|---|---|---|---|
| | 0.5 wt % EDTA | | | | 1.0 wt % EDTA | | |
| | Enzyme | | | | | | |
| Time, s | SAVINASE Ultra 16 XL | SAVINASE Evity 16 XL | BLAZE Pro 100L | Blank | ESPERASE 8.0L | BLAZE Pro 100L | Blank |
| | Degree of Hydrolysis, % | | | | | | |
| 0 | 0.00 | 0.00 | 0.00 | 0.00 | 0.00 | 0.00 | 0.00 |
| 60 | 10.80 | 10.19 | 9.76 | 0.53 | 9.91 | 9.13 | 0.95 |
| 120 | 13.74 | 12.74 | 12.81 | 1.01 | 13.30 | 12.48 | 1.81 |
| 180 | 15.61 | 14.29 | 14.62 | 1.51 | 15.41 | 13.86 | 2.57 |
| 240 | 16.92 | 15.48 | 15.85 | 1.90 | 16.98 | 15.19 | 3.12 |
| 300 | 17.98 | 16.32 | 16.95 | 2.26 | 18.35 | 16.28 | 3.63 |
| 360 | 18.77 | 17.32 | 17.64 | 2.61 | 19.36 | 17.00 | 4.15 |
| 420 | 19.57 | 18.10 | 18.38 | 2.97 | 20.31 | 17.83 | 4.64 |
| 480 | 20.36 | 18.84 | 18.89 | 3.31 | 21.18 | 18.57 | 5.13 |
| 540 | 21.00 | 19.60 | 19.30 | 3.46 | 22.01 | 19.30 | 5.66 |
| 600 | 21.60 | 20.16 | 19.59 | 3.72 | 22.80 | 19.87 | 5.97 |
| 660 | 21.60 | 20.16 | 19.66 | 3.72 | 22.80 | 19.87 | 5.97 |
| 720 | 21.60 | 20.16 | 19.66 | 3.72 | 22.80 | 19.87 | 5.97 |
| 780 | 21.60 | 20.16 | 19.66 | 3.72 | 22.80 | 19.87 | 5.97 |
| 840 | 21.60 | 20.16 | 19.66 | 3.72 | 22.80 | 19.87 | 5.97 |
| 900 | 21.60 | 20.16 | 19.66 | 3.72 | 22.80 | 19.87 | 5.97 |
| 960 | 21.60 | 20.16 | 19.66 | 3.72 | 22.80 | 19.87 | 5.97 |
| 1020 | 21.60 | 20.16 | 19.66 | 3.72 | 22.80 | 19.87 | 5.97 |
| 1080 | 21.60 | 20.16 | 19.66 | 3.72 | 22.80 | 19.87 | 5.97 |
| 1140 | 21.60 | 20.16 | 19.66 | 3.72 | 22.80 | 19.87 | 5.97 |
| 1200 | 21.60 | 20.16 | 19.66 | 3.72 | 22.80 | 19.87 | 5.97 |
| 1260 | 21.60 | 20.16 | 19.66 | 3.72 | 22.80 | 19.87 | 5.97 |
| 1320 | 21.60 | 20.16 | 19.66 | 3.72 | 22.80 | 19.87 | 5.97 |
| 1380 | 21.60 | 20.16 | 19.66 | 3.72 | 22.80 | 19.87 | 5.97 |
| 1440 | 21.60 | 20.16 | 19.66 | 3.72 | 22.80 | 19.87 | 5.97 |

TABLE 8C-continued

| | Binding Agent | | | | | | |
|---|---|---|---|---|---|---|---|
| | 0.5 wt % EDTA | | | | 1.0 wt % EDTA | | |
| | Enzyme | | | | | | |
| Time, s | SAVINASE Ultra 16 XL | SAVINASE Evity 16 XL | BLAZE Pro 100L | Blank | ESPERASE 8.0L | BLAZE Pro 100L | Blank |
| | Degree of Hydrolysis, % | | | | | | |
| 1500 | 21.60 | 20.16 | 19.66 | 3.72 | 22.80 | 19.87 | 5.97 |
| 1560 | 21.60 | 20.16 | 19.66 | 3.72 | 22.80 | 19.87 | 5.97 |
| 1620 | 21.60 | 20.16 | 19.66 | 3.72 | 22.80 | 19.87 | 5.97 |
| 1680 | 21.60 | 20.16 | 19.66 | 3.72 | 22.80 | 19.87 | 5.97 |
| 1740 | 21.60 | 20.16 | 19.66 | 3.72 | 22.80 | 19.87 | 5.97 |
| 1800 | 21.60 | 20.16 | 19.66 | 3.72 | 22.80 | 19.87 | 5.97 |
| 1860 | 21.60 | 20.16 | 19.66 | 3.72 | 22.80 | 19.87 | 5.97 |
| 1920 | 21.60 | 20.16 | 19.66 | 3.72 | 22.80 | 19.87 | 5.97 |
| 1980 | 21.60 | 20.16 | 19.66 | 3.72 | 22.80 | 19.87 | 5.97 |
| 2040 | 21.60 | 20.16 | 19.66 | 3.72 | 22.80 | 19.87 | 5.97 |
| 2100 | 21.60 | 20.16 | 19.66 | 3.72 | 22.80 | 19.87 | 5.97 |
| 2160 | 21.60 | 20.16 | 19.66 | 3.72 | 22.80 | 19.87 | 5.97 |
| 2220 | 21.60 | 20.16 | 19.66 | 3.72 | 22.80 | 19.87 | 5.97 |
| 2280 | 21.60 | 20.16 | 19.66 | 3.72 | 22.80 | 19.87 | 5.97 |
| 2340 | 21.60 | 20.16 | 19.66 | 3.72 | 22.80 | 19.87 | 5.97 |
| 2400 | 21.60 | 20.16 | 19.66 | 3.72 | 22.80 | 19.87 | 5.97 |
| 2460 | 29.44 | 25.23 | 29.35 | 9.10 | 34.66 | 32.31 | 9.66 |
| 2520 | 29.44 | 25.69 | 32.54 | 9.10 | 37.85 | 35.05 | 9.99 |
| 2580 | 29.44 | 25.94 | 33.91 | 9.14 | 40.10 | 36.85 | 10.55 |
| 2640 | 29.44 | 26.34 | 34.72 | 9.32 | 41.66 | 37.87 | 10.77 |
| 2700 | 29.51 | 26.68 | 35.48 | 9.53 | 42.71 | 38.81 | 11.01 |
| 2760 | 29.75 | 27.06 | 36.16 | 9.76 | 43.48 | 39.68 | 11.50 |
| 2820 | 29.96 | 27.33 | 36.80 | 10.03 | 44.37 | 40.41 | 11.96 |
| 2880 | 30.25 | 27.61 | 37.15 | 10.19 | 45.30 | 41.30 | 12.33 |
| 2940 | 30.51 | 28.04 | 37.63 | 10.55 | 46.16 | 41.97 | 12.71 |
| 3000 | 30.66 | 28.26 | 38.13 | 10.70 | 46.69 | 42.58 | 13.14 |

FIG. 2 provides a graphical representation of the variation in the DH % of sweet whey powder for enzyme substrate solutions dosed with 0.5 wt % EDTA as the binding agent. The results show that the enzyme BLAZE Pro 100L is still active after the addition of fresh substrate 30 minutes after being dosed with 0.5 wt % EDTA since the degree of hydrolysis follows a similar reaction rate found at the beginning of the experiment. However, the tested SAVINASE Ultra 16 XL and the SAVINASE Evity 16 XL enzymes are deactivated by 0.5 wt % EDTA since, after the addition of fresh substrate, the degree of hydrolysis follows the reaction rate as found for the blank solution.

FIG. 3 provides a graphical representation of the variation in the DH % of sweet whey powder for enzyme substrate solutions dosed with 0.125 wt % EDTA as the binding agent, while FIG. 4 provides a graphical representation of the variation in the DH % of sweet whey powder for enzyme substrate solutions dosed with 1.0 wt % EDTA as the binding agent. With the decreased amount of EDTA, the tested enzymes SAVINASE Ultra 16 XL and ALCALASE 2.5L are deactivated since, after the addition of fresh substrate, the degree of hydrolysis follows the reaction rate as found for the blank solution. However, the tested ESPERASE 8.0L remains active after addition of EDTA and fresh substrate as shown in FIG. 3. With the increased amount of EDTA, both the tested enzymes ESPERASE 8.0L and BLAZE Pro 100L are still active 30 minutes following the addition of fresh substrate after being dosed with 1.0 wt % EDTA since the degree of hydrolysis follows a similar reaction rate as found in the beginning of the experiment, see FIG. 4.

As the data shown in Table 8A demonstrates and graphically illustrated in FIG. 5, even when the SAVINASE Ultra 16 XL enzyme-based substrate solution is dosed with 0.01 wt % EDTA, this binding agent still is effective at deactivating this enzyme at this concentration since, after the addition of fresh substrate, the degree of hydrolysis follows the reaction rate as found for the blank solution. However, dosing with a concentration as low as 0.001 wt % EDTA or even at 0.005 wt % EDTA is not effective at deactivating the SAVINASE Ultra 16 XL enzyme since, after the addition of fresh substrate, the degree of hydrolysis does not continue to follow the reaction rate for the blank solution at this reduced concentration of EDTA.

Tables 9A and 9B provide the variation in the DH % for sweet whey powder for 0.115 wt %, 0.23 wt % and 0.46 wt % MGDA-Na salt as the binding agent dosed to the corresponding named enzyme substrate solutions at a pH of 10 and 50° C.

TABLE 9A

| | Binding Agent | | | |
|---|---|---|---|---|
| | 0.115 wt % MGDA | | 0.23 wt % MGDA | |
| | Enzyme | | | |
| Time, s | SAVINASE 16 Ultra XL | Blank | SAVINASE 16 Ultra XL | Blank |
| | Degree of Hydrolysis % | | | |
| 0 | 0.00 | 0.00 | 0.00 | 0.00 |
| 60 | 10.84 | 0.07 | 12.05 | 0.49 |
| 120 | 13.56 | 0.68 | 14.57 | 1.04 |
| 180 | 15.16 | 1.36 | 16.29 | 1.55 |
| 240 | 16.15 | 1.70 | 17.74 | 1.94 |
| 300 | 17.08 | 2.31 | 18.81 | 2.43 |
| 360 | 17.88 | 2.62 | 19.66 | 2.74 |
| 420 | 18.74 | 2.95 | 20.52 | 3.09 |
| 480 | 19.24 | 3.36 | 21.17 | 3.44 |
| 540 | 19.78 | 3.79 | 21.80 | 3.82 |
| 600 | 20.26 | 4.12 | 22.46 | 4.09 |

TABLE 9A-continued

| | Binding Agent | | | |
|---|---|---|---|---|
| | 0.115 wt % MGDA | | 0.23 wt % MGDA | |
| | Enzyme | | | |
| Time, s | SAVINASE 16 Ultra XL | Blank | SAVINASE 16 Ultra XL | Blank |
| | Degree of Hydrolysis % | | | |
| 660 | 20.28 | 4.12 | 22.46 | 4.09 |
| 720 | 20.28 | 4.12 | 22.46 | 4.09 |
| 780 | 20.28 | 4.12 | 22.46 | 4.09 |
| 840 | 20.28 | 4.12 | 22.46 | 4.09 |
| 900 | 20.28 | 4.12 | 22.46 | 4.09 |
| 960 | 20.28 | 4.12 | 22.46 | 4.09 |
| 1020 | 20.28 | 4.12 | 22.46 | 4.09 |
| 1080 | 20.28 | 4.12 | 22.46 | 4.09 |
| 1140 | 20.28 | 4.12 | 22.46 | 4.09 |
| 1200 | 20.28 | 4.12 | 22.46 | 4.09 |
| 1260 | 20.28 | 4.12 | 22.46 | 4.09 |
| 1320 | 20.28 | 4.12 | 22.46 | 4.09 |
| 1380 | 20.28 | 4.12 | 22.46 | 4.09 |
| 1440 | 20.28 | 4.12 | 22.46 | 4.09 |
| 1500 | 20.28 | 4.12 | 22.46 | 4.09 |
| 1560 | 20.28 | 4.12 | 22.46 | 4.09 |
| 1620 | 20.28 | 4.12 | 22.46 | 4.09 |
| 1680 | 20.28 | 4.12 | 22.46 | 4.09 |
| 1740 | 20.28 | 4.12 | 22.46 | 4.09 |
| 1800 | 20.28 | 4.12 | 22.46 | 4.09 |
| 1860 | 20.28 | 4.12 | 22.46 | 4.09 |
| 1920 | 20.28 | 4.12 | 22.46 | 4.09 |
| 1980 | 20.28 | 4.12 | 22.46 | 4.09 |
| 2040 | 20.28 | 4.12 | 22.46 | 4.09 |
| 2100 | 20.28 | 4.12 | 22.46 | 4.09 |
| 2160 | 20.28 | 4.12 | 22.46 | 4.09 |
| 2220 | 20.28 | 4.12 | 22.46 | 4.09 |
| 2280 | 20.28 | 4.12 | 22.46 | 4.09 |
| 2340 | 20.28 | 4.12 | 22.46 | 4.09 |
| 2400 | 20.28 | 4.12 | 22.46 | 4.09 |
| 2460 | 27.19 | 13.77 | 27.78 | 15.38 |
| 2520 | 27.19 | 13.77 | 27.78 | 15.43 |
| 2580 | 27.19 | 13.77 | 28.64 | 15.73 |
| 2640 | 27.19 | 14.02 | 28.90 | 15.84 |
| 2700 | 27.19 | 14.02 | 29.07 | 16.15 |
| 2760 | 27.19 | 14.24 | 29.26 | 16.29 |
| 2820 | 27.19 | 14.40 | 29.53 | 16.45 |
| 2880 | 27.40 | 14.70 | 29.91 | 16.67 |
| 2940 | 27.40 | 14.70 | 30.06 | 16.82 |
| 3000 | 27.56 | 14.97 | 30.41 | 17.00 |

TABLE 9B

| | Binding Agent | | | |
|---|---|---|---|---|
| | 0.46 wt % MGDA | | | |
| | Enzyme | | | |
| Time, s | SAVINASE Ultra 16 XL | SAVINASE Evity 16 XL | BLAZE Pro 100L | Blank |
| | Degree of Hydrolysis % | | | |
| 0 | 0.00 | 0.00 | 0.00 | 0.00 |
| 60 | 11.39 | 10.19 | 9.21 | 0.00 |
| 120 | 14.36 | 12.74 | 11.48 | 0.65 |
| 180 | 16.17 | 14.29 | 12.97 | 0.96 |
| 240 | 17.52 | 15.48 | 14.07 | 1.61 |
| 300 | 18.55 | 16.32 | 15.04 | 1.91 |
| 360 | 19.69 | 17.32 | 15.77 | 2.22 |
| 420 | 20.46 | 18.10 | 16.57 | 2.56 |
| 480 | 21.19 | 18.84 | 17.37 | 2.87 |
| 540 | 21.71 | 19.60 | 17.92 | 3.17 |
| 600 | 22.39 | 20.16 | 18.52 | 3.45 |
| 660 | 22.39 | 20.16 | 18.52 | 3.45 |
| 720 | 22.39 | 20.16 | 18.52 | 3.45 |
| 780 | 22.39 | 20.16 | 18.52 | 3.45 |
| 840 | 22.39 | 20.16 | 18.52 | 3.45 |
| 900 | 22.39 | 20.16 | 18.52 | 3.45 |

TABLE 9B-continued

| | Binding Agent | | | |
|---|---|---|---|---|
| | 0.46 wt % MGDA | | | |
| | Enzyme | | | |
| Time, s | SAVINASE Ultra 16 XL | SAVINASE Evity 16 XL | BLAZE Pro 100L | Blank |
| | Degree of Hydrolysis % | | | |
| 960 | 22.39 | 20.16 | 18.52 | 3.45 |
| 1020 | 22.39 | 20.16 | 18.52 | 3.45 |
| 1080 | 22.39 | 20.16 | 18.52 | 3.45 |
| 1140 | 22.39 | 20.16 | 18.52 | 3.45 |
| 1200 | 22.39 | 20.16 | 18.52 | 3.45 |
| 1260 | 22.39 | 20.16 | 18.52 | 3.45 |
| 1320 | 22.39 | 20.16 | 18.52 | 3.45 |
| 1380 | 22.39 | 20.16 | 18.52 | 3.45 |
| 1440 | 22.39 | 20.16 | 18.52 | 3.45 |
| 1500 | 22.39 | 20.16 | 18.52 | 3.45 |
| 1560 | 22.39 | 20.16 | 18.52 | 3.45 |
| 1620 | 22.39 | 20.16 | 18.52 | 3.45 |
| 1680 | 22.39 | 20.16 | 18.52 | 3.45 |
| 1740 | 22.39 | 20.16 | 18.52 | 3.45 |
| 1800 | 22.39 | 20.16 | 18.52 | 3.45 |
| 1860 | 22.39 | 20.16 | 18.52 | 3.45 |
| 1920 | 22.39 | 20.16 | 18.52 | 3.45 |
| 1980 | 22.39 | 20.16 | 18.52 | 3.45 |
| 2040 | 22.39 | 20.16 | 18.52 | 3.45 |
| 2100 | 22.39 | 20.16 | 18.52 | 3.45 |
| 2160 | 22.39 | 20.16 | 18.52 | 3.45 |
| 2220 | 22.39 | 20.16 | 18.52 | 3.45 |
| 2280 | 22.39 | 20.16 | 18.52 | 3.45 |
| 2340 | 22.39 | 20.16 | 18.52 | 3.45 |
| 2400 | 22.39 | 20.16 | 18.52 | 3.45 |
| 2460 | 26.92 | 25.23 | 32.77 | 6.41 |
| 2520 | 27.39 | 25.69 | 36.17 | 6.41 |
| 2580 | 27.57 | 25.94 | 37.42 | 6.41 |
| 2640 | 27.81 | 26.34 | 38.31 | 6.41 |
| 2700 | 28.03 | 26.68 | 39.05 | 6.67 |
| 2760 | 28.49 | 27.06 | 39.58 | 6.73 |
| 2820 | 28.73 | 27.33 | 40.31 | 7.08 |
| 2880 | 28.99 | 27.61 | 40.84 | 7.19 |
| 2940 | 29.35 | 28.04 | 41.31 | 7.57 |
| 3000 | 29.63 | 28.26 | 41.87 | 7.84 |

FIG. 6 provides a graphical representation of the variation in the DH % of sweet whey powder for enzyme substrate solutions dosed with 0.46 wt % MGDA as the binding agent, while FIG. 7 provides a graphical representation of the variation in the DH % of sweet whey powder for an enzyme substrate solution dosed with 0.115 wt % MGDA as the binding agent. As shown in FIG. 6, the enzyme BLAZE Pro 100L is still active 30 minutes following the addition of 0.46 wt % MGDA with the addition of fresh substrate since the degree of hydrolysis follows reaction rate that is similar to that found at the beginning of the experiment. However, the tested SAVINASE Ultra 16 XL and SAVINASE Evity 16 XL enzymes are deactivated by the 0.46% MGDA and at least the SAVINASE Ultra 16 XL enzyme is deactivated by the 0.115 wt % MGDA (see FIG. 7) since, after the addition of fresh substrate, the degree of hydrolysis follows the reaction rate as found for the blank solution.

Table 10 provides the variation in the DH % for sweet whey powder for 0.33 wt % HEDP-Na salt as the binding agent dosed to the corresponding named enzyme substrate solutions at a pH of 10 and 50° C.

TABLE 10

Binding Agent 0.33 wt % HEDP
Enzyme

| Time, s | SAVINASE Ultra 16 XL | ALCALASE 2.5L | ESPERASE 8.0L | BLAZE Pro 100L | Blank |
|---|---|---|---|---|---|
| | Degree of Hydrolysis % | | | | |
| 0 | 0.00 | 0.00 | 0.00 | 0.00 | 0.00 |
| 60 | 10.99 | 10.81 | 9.87 | 9.75 | 1.26 |
| 120 | 13.94 | 13.48 | 13.70 | 12.96 | 1.94 |
| 180 | 15.81 | 15.54 | 15.95 | 14.37 | 2.74 |
| 240 | 17.12 | 17.08 | 17.69 | 15.52 | 3.27 |
| 300 | 18.19 | 18.19 | 18.89 | 16.61 | 3.82 |
| 360 | 19.01 | 19.45 | 20.06 | 17.26 | 4.12 |
| 420 | 19.85 | 20.35 | 21.14 | 17.98 | 4.65 |
| 480 | 20.58 | 21.18 | 22.03 | 18.65 | 5.18 |
| 540 | 21.21 | 21.95 | 22.86 | 19.29 | 5.45 |
| 600 | 21.88 | 22.72 | 23.54 | 19.98 | 5.97 |
| 660 | 32.83 | 22.72 | 23.54 | 20.00 | 5.97 |
| 720 | 41.58 | 22.72 | 23.54 | 20.00 | 5.97 |
| 780 | 42.77 | 22.72 | 23.54 | 20.32 | 5.97 |
| 840 | 43.61 | 22.72 | 23.54 | 20.92 | 8.99 |
| 900 | 44.28 | 22.72 | 23.54 | 21.57 | 8.99 |
| 960 | 44.75 | 22.72 | 23.54 | 21.91 | 8.99 |
| 1020 | 45.18 | 22.72 | 23.54 | 22.21 | 8.99 |
| 1080 | 45.63 | 22.72 | 23.54 | 22.47 | 8.99 |
| 1140 | 45.63 | 22.72 | 23.54 | 22.62 | 8.99 |
| 1200 | 45.73 | 22.72 | 23.54 | 22.86 | 8.99 |
| 1260 | 45.74 | 22.72 | 23.54 | 23.05 | 8.99 |
| 1320 | 45.74 | 22.72 | 23.54 | 23.27 | 8.99 |
| 1380 | 45.74 | 22.72 | 23.54 | 23.55 | 8.99 |
| 1440 | 46.03 | 22.72 | 23.54 | 23.83 | 8.99 |
| 1500 | 46.03 | 22.72 | 23.54 | 23.83 | 8.99 |
| 1560 | 46.03 | 22.72 | 23.54 | 24.04 | 8.99 |
| 1620 | 46.17 | 22.72 | 23.54 | 24.32 | 8.99 |
| 1680 | 46.17 | 22.72 | 23.54 | 24.59 | 8.99 |
| 1740 | 46.35 | 22.72 | 23.54 | 24.84 | 8.99 |
| 1800 | 46.35 | 22.72 | 23.54 | 24.99 | 8.99 |
| 1860 | 46.51 | 22.72 | 23.54 | 25.27 | 8.99 |
| 1920 | 46.72 | 22.72 | 23.54 | 25.57 | 8.99 |
| 1980 | 46.72 | 22.72 | 23.54 | 25.57 | 8.99 |
| 2040 | 46.91 | 22.72 | 23.54 | 25.85 | 8.99 |
| 2100 | 46.91 | 22.72 | 23.54 | 26.06 | 8.99 |
| 2160 | 47.05 | 22.72 | 23.54 | 26.38 | 9.30 |
| 2220 | 47.27 | 22.72 | 23.54 | 26.62 | 9.64 |
| 2280 | 47.27 | 22.72 | 23.54 | 26.68 | 9.64 |
| 2340 | 47.52 | 22.72 | 23.70 | 26.95 | 9.94 |
| 2400 | 47.52 | 22.72 | 23.94 | 27.24 | 10.19 |
| 2460 | 57.73 | 33.09 | 40.32 | 44.16 | 21.18 |
| 2520 | 57.98 | 33.09 | 44.05 | 47.00 | 21.18 |
| 2580 | 58.23 | 33.09 | 46.08 | 48.37 | 21.76 |
| 2640 | 58.45 | 33.49 | 47.30 | 49.22 | 22.10 |
| 2700 | 58.71 | 33.85 | 48.34 | 49.95 | 22.37 |
| 2760 | 59.13 | 33.85 | 49.22 | 50.51 | 22.68 |
| 2820 | 59.24 | 34.17 | 49.89 | 51.18 | 22.95 |
| 2880 | 59.40 | 34.46 | 50.48 | 51.73 | 23.24 |
| 2940 | 59.62 | 34.77 | 51.09 | 52.10 | 23.64 |
| 3000 | 59.83 | 35.05 | 51.64 | 52.66 | 23.88 |

FIG. 8 provides a graphical representation of the variation in the DH % of sweet whey powder for enzyme substrate solutions dosed with 0.33 wt % HEDP as the binding agent. As shown in this figure, 30 minutes following the addition of 0.33 wt % HEDP and the addition of the fresh substrate, the degree of hydrolysis for the tested ESPERASE 8.0L and BLAZE Pro 100L follows a reaction rate that is similar to that found at the beginning of the experiment, which indicates these enzymes are still active. In contrast, the tested SAVINASE and ALCALASE 2.5L are deactivated with the addition of 0.33 wt % HEDP since, after addition of fresh substrate, the degree of hydrolysis follows a reaction rate that is similar to that of the blank solution.

Table 11 provides the variation in the DH % for sweet whey powder for Na salts of 1.0 wt % polyacrylate, 0.48 wt % ATMP and 0.57 wt % EDTMP as the various binding agents dosed to the SAVINASE ULTRA 16 XL enzyme substrate solutions at a pH of 10 and 50° C.

TABLE 11

Binding Agent

| | 1 wt % Polyacrylate | | 0.48 wt % ATMP | | 0.57 wt % EDTMP | |
|---|---|---|---|---|---|---|
| | Enzyme | | | | | |
| | SAVINASE Ultra 16 XL | Blank | SAVINASE Ultra 16 XL | Blank | SAVINASE Ultra 16 XL | Blank |
| Time, s | Degree of Hydrolysis % | | | | | |
| 0 | 0.00 | 0.00 | 0.00 | 0.00 | 0.00 | 0.00 |
| 60 | 10.78 | 0.00 | 11.14 | 1.14 | 10.10 | 0.00 |
| 120 | 14.09 | 0.52 | 14.81 | 1.91 | 13.14 | 0.00 |
| 180 | 15.53 | 0.92 | 16.90 | 2.76 | 14.83 | 0.27 |
| 240 | 16.84 | 1.17 | 18.32 | 3.35 | 16.08 | 0.43 |
| 300 | 17.92 | 1.62 | 19.55 | 3.98 | 17.00 | 0.62 |
| 360 | 18.80 | 2.14 | 20.59 | 4.44 | 17.69 | 0.84 |
| 420 | 19.53 | 2.36 | 21.57 | 4.90 | 18.43 | 1.02 |
| 480 | 20.45 | 2.62 | 22.28 | 5.42 | 18.98 | 1.18 |
| 540 | 21.06 | 3.12 | 23.02 | 5.69 | 19.50 | 1.37 |
| 600 | 21.64 | 3.34 | 23.75 | 6.22 | 20.00 | 1.57 |
| 660 | 21.64 | 3.34 | 41.64 | 25.46 | 48.53 | 30.94 |
| 720 | 21.64 | 3.34 | 42.48 | 26.18 | 78.07 | 52.79 |
| 780 | 21.64 | 3.34 | 43.28 | 26.74 | 88.83 | 54.58 |
| 840 | 21.64 | 3.34 | 43.85 | 27.17 | 88.83 | 56.57 |
| 900 | 21.64 | 3.34 | 44.34 | 27.66 | 88.83 | 58.49 |
| 960 | 21.64 | 3.34 | 44.78 | 27.92 | 89.24 | 59.99 |
| 1020 | 21.92 | 3.34 | 45.02 | 28.15 | 90.23 | 60.98 |
| 1080 | 22.29 | 3.66 | 45.34 | 28.41 | 91.00 | 61.89 |
| 1140 | 22.59 | 3.89 | 45.80 | 28.66 | 91.90 | 62.50 |
| 1200 | 22.87 | 4.34 | 46.05 | 28.97 | 92.41 | 63.02 |
| 1260 | 23.04 | 4.56 | 46.22 | 29.20 | 92.88 | 63.27 |
| 1320 | 23.20 | 4.79 | 46.63 | 29.48 | 93.31 | 63.49 |
| 1380 | 23.45 | 5.04 | 46.90 | 29.75 | 93.78 | 63.70 |
| 1440 | 23.65 | 5.32 | 47.15 | 29.92 | 94.30 | 63.83 |
| 1500 | 23.81 | 5.66 | 47.33 | 30.13 | 94.53 | 63.93 |
| 1560 | 24.14 | 5.92 | 47.76 | 30.13 | 94.89 | 64.08 |
| 1620 | 24.52 | 6.18 | 47.98 | 30.43 | 95.11 | 64.29 |
| 1680 | 24.52 | 6.32 | 48.29 | 30.75 | 95.35 | 64.29 |
| 1740 | 24.84 | 6.57 | 48.51 | 30.96 | 95.66 | 64.47 |
| 1800 | 24.84 | 6.84 | 48.80 | 30.99 | 96.07 | 64.64 |
| 1860 | 25.06 | 7.09 | 49.05 | 31.20 | 96.07 | 64.64 |
| 1920 | 25.25 | 7.40 | 49.31 | 31.54 | 96.38 | 64.85 |
| 1980 | 25.52 | 7.49 | 49.58 | 31.75 | 96.57 | 64.94 |
| 2040 | 25.70 | 7.82 | 49.85 | 31.86 | 96.83 | 65.10 |
| 2100 | 25.94 | 7.92 | 50.05 | 32.04 | 96.97 | 65.26 |
| 2160 | 26.17 | 8.28 | 50.34 | 32.26 | 97.22 | 65.26 |
| 2220 | 26.44 | 8.50 | 50.65 | 32.53 | 97.22 | 65.50 |
| 2280 | 26.44 | 8.67 | 50.88 | 32.74 | 97.46 | 65.69 |
| 2340 | 26.71 | 8.90 | 51.12 | 32.99 | 97.62 | 65.83 |
| 2400 | 26.95 | 9.20 | 51.40 | 33.15 | 97.85 | 65.97 |
| 2460 | 35.25 | 17.32 | 62.68 | 43.91 | 110.35 | 78.42 |
| 2520 | 36.10 | 17.32 | 63.13 | 44.16 | 110.62 | 78.42 |
| 2580 | 36.70 | 17.54 | 63.82 | 44.44 | 110.88 | 78.42 |
| 2640 | 37.32 | 17.91 | 64.26 | 44.72 | 111.22 | 78.42 |
| 2700 | 37.93 | 18.09 | 64.68 | 44.87 | 111.50 | 78.60 |
| 2760 | 38.47 | 18.27 | 65.25 | 45.25 | 111.87 | 78.89 |
| 2820 | 39.13 | 18.50 | 65.58 | 45.49 | 112.05 | 79.10 |
| 2880 | 39.58 | 18.53 | 65.85 | 45.65 | 112.20 | 79.29 |
| 2940 | 40.06 | 18.80 | 66.36 | 45.85 | 112.42 | 79.52 |
| 3000 | 40.56 | 18.95 | 66.65 | 46.28 | 112.72 | 79.77 |

FIG. 9 provides a graphical representation of the variation in the DH % of sweet whey powder for enzyme substrate solutions dosed with 1.0 wt % Polyacrylate as the binding agent. This test reveals that when 1.0 wt % Polyacrylate is used to deactivate SAVINASE Ultra 16 XL, the degree of hydrolysis after addition of extra substrate (after 40 min since the beginning of the test) follows a significant decreased rate in comparison to the beginning of the experiment. However, the reaction rate is increased in comparison to that of the blank solution, which indicates that Savinase Ultra 16XL is not completely deactivated.

Table 12 provides the variation in the DH % for sweet whey powder for 0.63 wt % KTPP as the binding agent dosed to the corresponding named enzyme substrate solutions at a pH of 10 and 50° C.

TABLE 12

| | Binding Agent 0.63 wt % KTPP | | | |
|---|---|---|---|---|
| | Enzyme | | | |
| Time, s | SAVINASE Ultra 16 XL | SAVINASE Evity 16 XL | BLAZE Pro 100L | Blank |
| | Degree of Hydrolysis % | | | |
| 0 | 0.00 | 0.00 | 0.00 | 0.00 |
| 60 | 10.85 | 10.37 | 8.94 | 0.00 |
| 120 | 14.02 | 13.10 | 11.34 | 0.00 |
| 180 | 15.82 | 15.04 | 12.59 | 0.19 |
| 240 | 17.00 | 16.52 | 13.62 | 0.39 |
| 300 | 18.02 | 17.69 | 14.47 | 0.58 |
| 360 | 19.04 | 18.66 | 15.21 | 0.81 |
| 420 | 19.80 | 19.58 | 15.95 | 1.02 |
| 480 | 20.64 | 20.31 | 16.59 | 1.24 |
| 540 | 21.29 | 21.15 | 17.27 | 1.61 |
| 600 | 21.95 | 21.97 | 17.74 | 1.79 |
| 660 | 28.97 | 31.26 | 24.69 | 8.98 |
| 720 | 30.46 | 32.29 | 25.96 | 9.96 |
| 780 | 31.23 | 32.83 | 26.77 | 10.46 |
| 840 | 31.84 | 33.17 | 27.41 | 10.90 |
| 900 | 32.40 | 33.49 | 27.80 | 11.10 |
| 960 | 32.79 | 33.89 | 28.21 | 11.27 |
| 1020 | 32.96 | 34.12 | 28.61 | 11.42 |
| 1080 | 33.25 | 34.40 | 28.97 | 11.60 |
| 1140 | 33.41 | 34.68 | 29.38 | 11.69 |
| 1200 | 33.59 | 34.93 | 29.78 | 11.88 |
| 1260 | 33.85 | 35.11 | 29.94 | 12.01 |
| 1320 | 34.00 | 35.32 | 30.33 | 12.18 |
| 1380 | 34.30 | 35.54 | 30.52 | 12.34 |
| 1440 | 34.46 | 35.89 | 30.85 | 12.34 |
| 1500 | 34.59 | 36.14 | 31.22 | 12.46 |
| 1560 | 34.70 | 36.35 | 31.41 | 12.65 |
| 1620 | 34.99 | 36.44 | 31.54 | 12.84 |
| 1680 | 35.16 | 36.81 | 31.85 | 12.98 |
| 1740 | 35.29 | 37.00 | 32.00 | 12.99 |
| 1800 | 35.50 | 37.11 | 32.27 | 13.14 |
| 1860 | 35.62 | 37.31 | 32.49 | 13.29 |
| 1920 | 35.87 | 37.54 | 32.67 | 13.39 |
| 1980 | 36.03 | 37.74 | 32.83 | 13.54 |
| 2040 | 36.13 | 38.10 | 33.08 | 13.67 |
| 2100 | 36.44 | 38.28 | 33.25 | 13.82 |
| 2160 | 36.62 | 38.47 | 33.41 | 14.01 |
| 2220 | 36.78 | 38.72 | 33.66 | 14.21 |
| 2280 | 36.99 | 39.03 | 33.94 | 14.21 |
| 2340 | 36.99 | 39.18 | 34.10 | 14.40 |
| 2400 | 37.23 | 39.36 | 34.28 | 14.55 |
| 2460 | 46.11 | 48.17 | 49.33 | 23.08 |
| 2520 | 46.11 | 48.75 | 52.13 | 23.08 |
| 2580 | 46.40 | 49.25 | 53.58 | 23.08 |
| 2640 | 46.62 | 49.74 | 54.32 | 23.23 |
| 2700 | 46.84 | 50.08 | 55.10 | 23.33 |
| 2760 | 47.12 | 50.50 | 55.71 | 23.56 |
| 2820 | 47.14 | 50.99 | 56.20 | 23.73 |
| 2880 | 47.36 | 51.33 | 56.63 | 23.93 |
| 2940 | 47.82 | 51.59 | 57.01 | 23.93 |
| 3000 | 47.91 | 52.20 | 57.56 | 24.22 |

Table 13 provides the variation in the DH % for sweet whey powder for 0.37 wt % and 1.0 wt % Na-gluconate as the binding agent dosed to the SAVINASE Ultra 16 XL enzyme substrate solutions at a pH of 10 and 50° C.

TABLE 13

| | Binding Agent | | | |
|---|---|---|---|---|
| | 0.37 wt % Gluconate | | 1.0 wt % Gluconate | |
| | Enzyme | | | |
| Time, s | SAVINASE Ultra 16 XL | Blank | SAVINASE Ultra 16 XL | Blank |
| | Degree of Hydrolysis % | | | |
| 0 | 0.00 | 0.00 | 0.00 | 0.00 |
| 60 | 11.62 | 1.23 | 11.55 | 0.00 |
| 120 | 14.45 | 2.36 | 14.27 | 0.25 |
| 180 | 16.43 | 3.22 | 16.11 | 0.40 |
| 240 | 17.65 | 4.03 | 17.29 | 0.73 |
| 300 | 19.00 | 4.83 | 18.34 | 0.91 |
| 360 | 20.09 | 5.39 | 19.23 | 1.19 |
| 420 | 21.10 | 6.27 | 20.02 | 1.41 |
| 480 | 22.06 | 6.88 | 20.66 | 1.74 |
| 540 | 22.98 | 7.68 | 21.46 | 1.95 |
| 600 | 23.65 | 8.49 | 22.10 | 2.13 |
| 660 | 28.76 | 13.97 | 32.58 | 13.60 |
| 720 | 29.92 | 15.20 | 34.08 | 14.67 |
| 780 | 30.81 | 16.02 | 35.18 | 15.65 |
| 840 | 31.61 | 16.86 | 35.97 | 16.17 |
| 900 | 32.41 | 17.62 | 36.59 | 16.65 |
| 960 | 33.13 | 18.36 | 37.26 | 16.94 |
| 1020 | 33.84 | 19.10 | 37.84 | 17.40 |
| 1080 | 34.63 | 19.86 | 38.39 | 17.73 |
| 1140 | 35.25 | 20.52 | 39.00 | 18.16 |
| 1200 | 36.08 | 21.23 | 39.54 | 18.47 |
| 1260 | 36.90 | 22.03 | 40.10 | 18.77 |
| 1320 | 37.47 | 22.86 | 40.64 | 19.01 |
| 1380 | 38.13 | 23.52 | 41.16 | 19.46 |
| 1440 | 38.90 | 24.15 | 41.69 | 19.77 |
| 1500 | 39.43 | 24.94 | 42.24 | 20.02 |
| 1560 | 40.23 | 25.55 | 42.54 | 20.48 |
| 1620 | 40.81 | 26.24 | 43.16 | 20.82 |
| 1680 | 41.31 | 26.73 | 43.67 | 21.03 |
| 1740 | 42.11 | 27.46 | 44.22 | 21.43 |
| 1800 | 42.65 | 27.96 | 44.47 | 21.69 |
| 1860 | 43.48 | 28.67 | 45.02 | 22.10 |
| 1920 | 44.01 | 29.30 | 45.30 | 22.44 |
| 1980 | 44.66 | 30.04 | 45.75 | 22.74 |
| 2040 | 45.37 | 30.58 | 46.18 | 23.07 |
| 2100 | 45.94 | 31.37 | 46.67 | 23.35 |
| 2160 | 46.54 | 31.92 | 46.92 | 23.75 |
| 2220 | 47.20 | 32.50 | 47.52 | 24.03 |
| 2280 | 47.71 | 33.22 | 47.81 | 24.30 |
| 2340 | 48.22 | 33.74 | 48.10 | 24.54 |
| 2400 | 48.85 | 34.29 | 48.66 | 24.84 |
| 2460 | 68.00 | 43.56 | 64.65 | 34.73 |
| 2520 | 70.84 | 44.44 | 67.11 | 34.88 |
| 2580 | 72.46 | 45.19 | 68.46 | 35.34 |
| 2640 | 73.85 | 45.73 | 69.40 | 35.61 |
| 2700 | 74.96 | 46.47 | 70.29 | 36.16 |
| 2760 | 75.97 | 47.05 | 70.97 | 36.49 |
| 2820 | 76.92 | 47.80 | 71.54 | 36.82 |
| 2880 | 77.88 | 48.31 | 72.04 | 37.23 |
| 2940 | 78.67 | 49.02 | 72.64 | 37.53 |
| 3000 | 79.56 | 49.52 | 73.14 | 37.89 |

Table 14 provides the variation in the DH % for sweet whey powder for 0.45 wt % HEDTA-Na salt as the binding agents dosed to the corresponding named enzyme substrate solutions at a pH of 10 and 50° C.

TABLE 14

| | Binding Agent 0.45 wt % HEDTA | | | |
| | Enzyme | | | |
| Time, s | SAVINASE Ultra 16 XL | SAVINASE Evity 16 XL | BLAZE Pro 100L | Blank |
| | Degree of Hydrolysis % | | | |
| --- | --- | --- | --- | --- |
| 0 | 0.00 | 0.00 | 0.00 | 0.00 |
| 60 | 10.26 | 8.93 | 9.03 | 0.33 |
| 120 | 13.46 | 12.05 | 10.40 | 0.90 |
| 180 | 15.18 | 12.99 | 12.37 | 1.38 |
| 240 | 16.27 | 14.08 | 13.02 | 1.75 |
| 300 | 17.19 | 14.72 | 13.55 | 2.12 |
| 360 | 18.17 | 15.43 | 14.44 | 2.47 |
| 420 | 19.04 | 15.90 | 15.02 | 2.96 |
| 480 | 19.55 | 16.67 | 15.49 | 3.26 |
| 540 | 20.01 | 17.02 | 15.98 | 3.60 |
| 600 | 20.94 | 17.73 | 16.39 | 3.87 |
| 660 | 20.94 | 17.73 | 16.39 | 3.87 |
| 720 | 21.03 | 18.44 | 16.39 | 3.87 |
| 780 | 23.34 | 19.71 | 16.39 | 3.87 |
| 840 | 24.72 | 21.04 | 17.61 | 3.87 |
| 900 | 25.59 | 21.61 | 18.61 | 3.87 |
| 960 | 25.99 | 22.20 | 19.47 | 3.87 |
| 1020 | 26.33 | 22.46 | 20.26 | 3.87 |
| 1080 | 26.63 | 22.82 | 20.57 | 3.87 |
| 1140 | 26.63 | 22.82 | 20.63 | 3.87 |
| 1200 | 26.63 | 22.82 | 20.76 | 3.87 |
| 1260 | 26.63 | 22.82 | 20.76 | 3.87 |
| 1320 | 26.63 | 22.82 | 20.76 | 3.87 |
| 1380 | 26.63 | 22.82 | 20.76 | 3.87 |
| 1440 | 26.63 | 22.82 | 20.76 | 3.87 |
| 1500 | 26.63 | 22.82 | 20.76 | 3.87 |
| 1560 | 26.63 | 22.82 | 20.76 | 3.87 |
| 1620 | 26.63 | 22.82 | 21.00 | 3.87 |
| 1680 | 26.63 | 22.82 | 21.00 | 3.87 |
| 1740 | 26.63 | 23.10 | 21.00 | 3.87 |
| 1800 | 26.63 | 23.10 | 21.37 | 3.87 |
| 1860 | 26.63 | 23.10 | 21.37 | 3.87 |
| 1920 | 26.63 | 23.10 | 21.37 | 3.87 |
| 1980 | 26.63 | 23.10 | 21.77 | 3.87 |
| 2040 | 26.63 | 23.38 | 21.77 | 3.87 |
| 2100 | 26.63 | 23.38 | 21.77 | 3.87 |
| 2160 | 26.63 | 23.38 | 22.12 | 3.87 |
| 2220 | 26.63 | 23.83 | 22.12 | 3.87 |
| 2280 | 26.91 | 23.83 | 22.12 | 3.87 |
| 2340 | 26.91 | 24.12 | 22.55 | 3.87 |
| 2400 | 26.91 | 24.14 | 22.55 | 3.87 |
| 2460 | 36.46 | 33.45 | 37.78 | 13.46 |
| 2520 | 36.46 | 33.45 | 40.46 | 13.46 |
| 2580 | 36.46 | 33.45 | 42.16 | 13.46 |
| 2640 | 37.18 | 33.78 | 43.23 | 13.46 |
| 2700 | 37.18 | 33.85 | 43.72 | 13.46 |
| 2760 | 37.55 | 34.21 | 44.17 | 13.46 |
| 2820 | 37.55 | 34.50 | 44.65 | 13.46 |
| 2880 | 37.97 | 34.50 | 45.21 | 13.62 |
| 2940 | 37.97 | 34.90 | 45.70 | 13.76 |
| 3000 | 38.72 | 35.02 | 46.11 | 13.83 |

Table 15 provides the variation in the DH % for sweet whey powder Na-salts for 0.66 wt % DTPA, 0.08 wt % NTA and 0.46 wt % GLDA as the various binding agents dosed to the SAVINASE Ultra 16 XL enzyme substrate solutions at a pH of 10 and 50° C.

TABLE 15

| | Binding Agent | | | | | |
| | 0.66 wt % DTPA | | 0.08 wt % NTA | | 0.46 wt % GLDA | |
| | Enzyme | | | | | |
| Time (s) | SAVINASE Ultra 16 XL | Blank | SAVINASE Ultra 16 XL | Blank | SAVINASE Ultra 16 XL | Blank |
| | Degree of Hydrolysis % | | | | | |
| --- | --- | --- | --- | --- | --- | --- |
| 0 | 0.00 | 0.00 | 0.00 | 0.00 | 0.00 | 0.00 |
| 60 | 11.15 | 0.81 | 11.20 | 0.77 | 10.41 | 0.99 |
| 120 | 13.95 | 1.39 | 14.10 | 1.47 | 12.96 | 1.64 |
| 180 | 15.33 | 1.88 | 15.61 | 2.03 | 14.40 | 2.46 |
| 240 | 16.53 | 2.34 | 16.77 | 2.53 | 15.30 | 2.95 |
| 300 | 17.47 | 2.83 | 17.76 | 2.86 | 16.26 | 3.36 |
| 360 | 18.20 | 3.20 | 18.57 | 3.36 | 16.93 | 3.73 |
| 420 | 18.87 | 3.58 | 19.39 | 3.64 | 17.49 | 3.98 |
| 480 | 19.50 | 4.00 | 19.98 | 4.12 | 18.10 | 4.43 |
| 540 | 20.05 | 4.31 | 20.69 | 4.50 | 18.53 | 4.67 |
| 600 | 20.54 | 4.68 | 21.24 | 4.92 | 18.97 | 4.80 |
| 660 | 20.54 | 4.68 | 21.25 | 4.92 | 22.87 | 4.81 |
| 720 | 20.54 | 4.68 | 21.25 | 4.92 | 22.87 | 5.35 |
| 780 | 20.54 | 4.68 | 21.25 | 4.92 | 23.28 | 7.11 |
| 840 | 20.54 | 4.68 | 21.25 | 4.92 | 23.37 | 8.28 |
| 900 | 20.54 | 4.68 | 21.25 | 4.92 | 23.62 | 9.06 |
| 960 | 20.54 | 4.68 | 21.25 | 4.92 | 23.62 | 9.23 |
| 1020 | 20.54 | 4.68 | 21.25 | 4.92 | 23.62 | 9.54 |
| 1080 | 20.54 | 4.68 | 21.25 | 4.92 | 23.62 | 9.57 |
| 1140 | 20.54 | 4.68 | 21.25 | 4.92 | 23.62 | 9.58 |
| 1200 | 20.54 | 4.68 | 21.25 | 4.92 | 23.62 | 9.58 |
| 1260 | 20.54 | 4.68 | 21.25 | 4.92 | 23.62 | 9.58 |
| 1320 | 20.54 | 4.68 | 21.25 | 4.92 | 23.62 | 9.58 |
| 1380 | 20.54 | 4.68 | 21.25 | 4.92 | 23.62 | 9.58 |
| 1440 | 20.54 | 4.68 | 21.25 | 4.92 | 23.68 | 9.58 |
| 1500 | 20.54 | 4.68 | 21.25 | 4.92 | 23.96 | 9.58 |
| 1560 | 20.54 | 4.68 | 21.25 | 4.92 | 23.96 | 9.58 |
| 1620 | 20.54 | 4.68 | 21.25 | 4.92 | 24.19 | 9.58 |
| 1680 | 20.54 | 4.68 | 21.25 | 4.92 | 24.20 | 9.58 |

TABLE 15-continued

| | Binding Agent | | | | | |
|---|---|---|---|---|---|---|
| | 0.66 wt % DTPA | | 0.08 wt % NTA | | 0.46 wt % GLDA | |
| | Enzyme | | | | | |
| Time (s) | SAVINASE Ultra 16 XL | Blank | SAVINASE Ultra 16 XL | Blank | SAVINASE Ultra 16 XL | Blank |
| | Degree of Hydrolysis % | | | | | |
| 1740 | 20.54 | 4.68 | 21.25 | 4.92 | 24.41 | 9.58 |
| 1800 | 20.54 | 4.68 | 21.25 | 4.92 | 24.57 | 9.58 |
| 1860 | 20.54 | 4.68 | 21.25 | 4.92 | 24.93 | 9.58 |
| 1920 | 20.54 | 4.68 | 21.25 | 4.92 | 25.13 | 9.58 |
| 1980 | 20.54 | 4.68 | 21.25 | 4.92 | 25.38 | 9.58 |
| 2040 | 20.54 | 4.68 | 21.25 | 4.92 | 26.18 | 9.58 |
| 2100 | 20.54 | 4.68 | 21.25 | 4.92 | 26.33 | 9.58 |
| 2160 | 20.54 | 4.68 | 21.25 | 4.92 | 26.33 | 9.58 |
| 2220 | 20.54 | 4.68 | 21.25 | 4.92 | 26.78 | 9.58 |
| 2280 | 20.54 | 4.68 | 21.25 | 4.92 | 27.00 | 9.58 |
| 2340 | 20.54 | 4.68 | 21.25 | 4.92 | 27.21 | 9.58 |
| 2400 | 20.54 | 4.68 | 21.25 | 4.92 | 27.96 | 9.58 |
| 2460 | 26.80 | 11.48 | 23.62 | 8.58 | 37.17 | 17.73 |
| 2520 | 26.98 | 11.48 | 23.62 | 8.58 | 37.17 | 17.73 |
| 2580 | 27.40 | 11.64 | 23.62 | 8.58 | 37.63 | 17.73 |
| 2640 | 27.60 | 11.64 | 23.95 | 8.58 | 37.91 | 17.73 |
| 2700 | 27.80 | 11.83 | 23.95 | 8.58 | 38.21 | 17.73 |
| 2760 | 28.05 | 12.20 | 24.24 | 8.77 | 38.51 | 17.73 |
| 2820 | 28.46 | 12.31 | 24.24 | 9.02 | 38.83 | 17.73 |
| 2880 | 28.80 | 12.39 | 24.59 | 9.05 | 39.14 | 18.07 |
| 2940 | 28.98 | 12.74 | 24.84 | 9.43 | 39.32 | 18.41 |
| 3000 | 29.31 | 12.91 | 24.84 | 9.45 | 39.81 | 18.41 |

Table 16 provides the variation in the DH % for sweet whey powder Na-salts for 0.36 wt % PBTC and 0.75 wt % DTPMP as the various binding agents dosed to the SAVINASE Ultra 16 XL enzyme substrate solutions at a pH of 10 and 50° C.

TABLE 16

| | Binding Agent | | | |
|---|---|---|---|---|
| | 0.36% PBTC | | 0.75 wt % DTPMP | |
| | Enzyme | | | |
| Time, s | SAVINASE Ultra 16 XL | Blank | SAVINASE Ultra 16 XL | Blank |
| | Degree of Hydrolysis % | | | |
| 0 | 0.00 | 0.00 | 0.00 | 0.00 |
| 60 | 11.02 | 0.00 | 10.77 | 0.24 |
| 120 | 13.95 | 0.37 | 13.74 | 0.65 |
| 180 | 15.47 | 0.74 | 15.36 | 0.88 |
| 240 | 16.60 | 1.10 | 16.44 | 1.03 |
| 300 | 17.49 | 1.47 | 17.46 | 1.21 |
| 360 | 18.29 | 1.81 | 18.39 | 1.35 |
| 420 | 19.07 | 2.17 | 19.20 | 1.51 |
| 480 | 19.79 | 2.52 | 20.07 | 1.68 |
| 540 | 20.39 | 2.95 | 21.01 | 1.84 |
| 600 | 20.99 | 3.20 | 21.75 | 2.02 |
| 660 | 21.22 | 3.25 | 21.77 | 2.02 |
| 720 | 21.22 | 3.25 | 23.06 | 7.35 |
| 780 | 22.18 | 3.25 | 24.53 | 8.95 |
| 840 | 22.95 | 3.46 | 25.79 | 10.20 |
| 900 | 23.65 | 3.93 | 26.55 | 11.10 |
| 960 | 24.12 | 4.15 | 27.17 | 11.93 |
| 1020 | 24.57 | 4.58 | 27.70 | 12.44 |
| 1080 | 24.98 | 4.67 | 27.92 | 12.87 |
| 1140 | 25.39 | 4.90 | 28.00 | 13.08 |
| 1200 | 25.62 | 5.10 | 28.00 | 13.33 |
| 1260 | 25.90 | 5.19 | 28.00 | 13.33 |
| 1320 | 26.02 | 5.42 | 28.00 | 13.58 |
| 1380 | 26.28 | 5.62 | 28.00 | 13.58 |
| 1440 | 26.53 | 5.62 | 28.00 | 13.90 |
| 1440 | 26.53 | 5.62 | 28.00 | 13.90 |
| 1500 | 26.69 | 5.70 | 28.00 | 13.90 |
| 1560 | 26.84 | 5.99 | 28.00 | 13.90 |
| 1620 | 27.00 | 6.16 | 28.16 | 13.90 |
| 1680 | 27.21 | 6.26 | 28.16 | 14.07 |
| 1740 | 27.42 | 6.53 | 28.22 | 14.12 |
| 1800 | 27.58 | 6.59 | 28.27 | 14.37 |
| 1860 | 27.67 | 6.78 | 28.42 | 14.37 |
| 1920 | 27.77 | 6.97 | 28.65 | 14.58 |
| 1980 | 27.98 | 7.12 | 28.76 | 14.58 |
| 2040 | 28.04 | 7.27 | 28.82 | 14.83 |
| 2100 | 28.19 | 7.45 | 29.04 | 15.05 |
| 2160 | 28.34 | 7.66 | 29.04 | 15.18 |
| 2220 | 28.34 | 7.73 | 29.15 | 15.38 |
| 2280 | 28.41 | 7.92 | 29.32 | 15.61 |
| 2340 | 28.62 | 8.16 | 29.47 | 15.61 |
| 2400 | 28.62 | 8.23 | 29.67 | 15.87 |
| 2460 | 40.16 | 18.37 | 41.08 | 26.95 |
| 2520 | 40.67 | 18.66 | 41.40 | 27.46 |
| 2580 | 41.72 | 19.01 | 41.77 | 27.74 |
| 2640 | 42.80 | 19.33 | 41.94 | 27.97 |
| 2700 | 43.49 | 19.61 | 42.22 | 28.25 |
| 2760 | 44.08 | 19.84 | 42.30 | 28.56 |
| 2820 | 44.69 | 20.03 | 42.55 | 28.56 |
| 2880 | 45.34 | 20.24 | 42.79 | 28.78 |
| 2940 | 45.71 | 20.40 | 42.99 | 29.19 |
| 3000 | 46.32 | 20.65 | 43.22 | 29.38 |

Table 17 provides an overview of the test results with each of the salts of the binding agents dosed to the enzyme substrate solution at a pH of 10 and 50° C. A "D" represents the enzyme was deactivated, while an "A" represents that the enzyme was active after the second substrate addition. A "-" represents not tested. As this table shows, most all of the tested binding agents show a deactivation of SAVINASE Ultra 16 XL, under cleaning conditions having a pH of 10 and 50° C. The tested binding agents at certain concentrations are effective at deactivating SAVINASE Evity 16 XL. The tested binding agents were ineffective at deactivating BLAZE Pro 100L and ESPERASE 8.0L. 0.125 wt % EDTA and 0.33 wt % HEDP were able to deactivate ALCALASE 2.5L.

The enzymatic cleaning with SAVINASE Ultra 16 XL can be deactivated by the addition of the binding agents at the identified concentrations, except with the use of gluconate and PBTC in Table 18, in this cleaning solution without intermediate rinse and without an extra deactivation step using, for example, an acid reducing the pH. This reduces the total cleaning time significantly and thus accelerates the membrane cleaning.

TABLE 17

| | | Enzyme | | | | |
|---|---|---|---|---|---|---|
| Binding Agent | Concentration wt % | SAVINASE Ultra 16 XL | SAVINASE Evity 16 XL | BLAZE Pro 100L | ESPERASE 8.0L | ALCALASE 2.5L |
| EDTA | 1.000 | — | — | A | A | — |
|  | 0.500 | D | D | A | — | — |
|  | 0.250 | D | — | — | — | — |
|  | 0.125 | D | — | — | A | D |
|  | 0.01 | D | — | — | — | — |
|  | 0.005 | A | — | — | — | — |
|  | 0.001 | A | — | — | — | — |
| MGDA | 0.460 | D | D | A | — | — |
|  | 0.230 | D | — | — | — | — |
|  | 0.115 | D | — | — | — | — |
| NTA | 0.080 | D | — | — | — | — |
| GLDA | 0.460 | D | — | — | — | — |
| HEDTA | 0.450 | D | D | A | — | — |
| DTPA | 0.660 | D | — | — | — | — |
| Gluconate | 0.370 | A | — | — | — | — |
|  | 1.000 | A | — | — | — | — |
| KTPP | 0.630 | D | D | A | — | — |
| ATMP | 0.480 | D | — | — | — | — |
| PBTC | 0.360 | D < 100% | — | — | — | — |
| HEDP | 0.330 | D | — | A | A | D |
| EDTMP | 0.570 | D | — | — | — | — |
| DTPMP | 0.750 | D | — | — | — | — |
| Polyacrylate | 1.000 | D < 100% | — | — | — | — |

Table 18 shows the results of the salts of the binding agent tests using SAVINASE Ultra 16 XL.

TABLE 18

| | | Degree of Hydrolysis % | | | | |
|---|---|---|---|---|---|---|
| | | After 5 min of initial substrate addition | | After 5 min of second substrate addition | | |
| Binding Agent | Concentration wt % | SAVINASE Ultra 16 XL | Blank | SAVINASE Ultra 16 XL | Blank | Conclusion |
| EDTA | 0.50 | 16.4 | 1.7 | 0.2 | 0.6 | D |
|  | 0.25 | 19.2 | 4.6 | 0.4 | 0.4 | D |
|  | 0.125 | 16.3 | 1.7 | 0.0 | 0.2 | D |
|  | 0.01 | 13.7 | 0.3 | 0.0 | 0.0 | D |
|  | 0.005 | 14.8 | 0.0 | 13.4 | 0.6 | A |
|  | 0.001 | 12.7 | 0.0 | 12.5 | 0.4 | A |
| MGDA | 0.46 | 17.1 | 1.3 | 1.2 | 0.3 | D |
|  | 0.23 | 18.8 | 2.4 | 1.3 | 0.8 | D |
|  | 0.115 | 17.1 | 2.3 | 0.0 | 0.3 | D |
| NTA | 0.08 | 17.8 | 2.9 | 0.3 | 0.0 | D |
| GLDA | 0.46 | 16.3 | 3.4 | 0.7 | 0.0 | D |
| HEDTA | 0.45 | 17.2 | 2.1 | 0.8 | 0.0 | D |
| DTPA | 0.66 | 17.5 | 2.8 | 1.4 | 0.4 | D |
| Gluconate | 0.37 | 19.0 | 4.8 | 19.3 | 2.5 | A |
|  | 1.0 | 18.3 | 0.9 | 16.7 | 1.7 | A |
| KTPP | 0.63 | 16.6 | 0.4 | 0.9 | 0.2 | D |
| ATMP | 0.48 | 19.6 | 4.0 | 2.3 | 1.1 | D |
| PBTC | 0.36 | 17.5 | 1.5 | 5.1 | 1.2 | D < 100% |
| HEDP | 0.33 | 18.2 | 3.8 | 1.2 | 1.5 | D |
| EDTMP | 0.57 | 17.0 | 0.6 | 1.5 | 0.3 | D |
| DTPMP | 0.75 | 17.5 | 1.2 | 1.2 | 2.1 | D |
| Polyacrylate | 1.0 | 17.9 | 1.6 | 3.7 | 0.8 | D < 100% |

Table 19 shows the results of the salts of the binding agent tests that effectively deactivated the SAVINASE Evity 16 XL enzyme.

TABLE 19

| | | Degree of Hydrolysis % | | | | |
|---|---|---|---|---|---|---|
| | | After 5 min of initial substrate addition | | After 5 min of second substrate addition | | |
| Binding Agent | Concentration wt % | SAVINASE Evity 16 XL | Blank | SAVINASE Evity 16 XL | Blank | Conclusion |
| EDTA | 0.5 | 16.3 | 1.7 | 1.6 | 0.6 | D |
| MGDA | 0.46 | 16.3 | 1.3 | 1.6 | 0.3 | D |
| HEDTA | 0.45 | 14.7 | 2.1 | 0.7 | 0.0 | D |
| KTPP | 0.63 | 17.7 | 0.4 | 1.5 | 0.2 | D |

The results in Table 19 show that SAVINASE Evity 16XL may also be deactivated using a binding agent in a similar way and may also be used in an accelerated membrane cleaning procedure.

Table 20 shows the results of the salts of the binding agent tests on the BLAZE Pro 100L enzyme.

TABLE 20

| | | Degree of Hydrolysis % | | | | |
|---|---|---|---|---|---|---|
| | | After 5 min of initial substrate addition | | After 5 min of second substrate addition | | |
| Binding Agent | Concentration wt % | BLAZE Pro 100L | Blank | BLAZE Pro 100L | Blank | Conclusion |
| EDTA | 1.0 | 16.3 | 3.6 | 12.8 | 1.6 | A |
| | 0.5 | 15.4 | 1.7 | 9.5 | 0.6 | A |
| MGDA | 0.46 | 13.6 | 1.3 | 14.9 | 0.3 | A |
| HEDTA | 0.45 | 13.5 | 2.1 | 8.1 | 0.0 | A |
| KTPP | 0.63 | 13.3 | 0.4 | 11.8 | 0.2 | A |
| HEDP | 0.33 | 16.6 | 1.2 | 11.5 | 1.5 | A |

Table 21 shows the results of the salts of the binding agent tests on the ESPERASE 8.0L enzyme.

TABLE 21

| | | Degree of Hydrolysis % | | | | |
|---|---|---|---|---|---|---|
| | | After 5 min of initial substrate addition | | After 5 min of second substrate addition | | |
| Binding Agent | Concentration wt % | ESPERASE 8.0L | Blank | ESPERASE 8.0L | Blank | Conclusion |
| EDTA | 1.0 | 18.4 | 3.6 | 14.0 | 1.6 | A |
| | 0.125 | 17.7 | 1.7 | 16.3 | 0.2 | A |
| HEDP | 0.33 | 18.9 | 1.2 | 13.1 | 1.5 | A |

Table 22 shows the results of the salts of the binding agent tests on the ALCALASE 2.5L enzyme.

TABLE 22

| | | Degree of Hydrolysis % | | | | |
|---|---|---|---|---|---|---|
| | | After 5 min of initial substrate addition | | After 5 min of second substrate addition | | |
| Binding Agent | Concentration wt % | ALCALASE 2.5L | Blank | ALCALASE 2.5L | Blank | Conclusion |
| EDTA | 0.125 | 16.6 | 1.7 | 0.8 | 0.2 | D |
| HEDP | 0.33 | 18.2 | 1.2 | 0.7 | 1.5 | D |

The results in Table 22 show that ALCALASE 2.5L may also be deactivated using a binding agent in a similar way and may also be used in an accelerated membrane cleaning procedure.

In summary, without intending to be bound by the theory, these tests demonstrate that enzymes structured to have strong calcium bonding such as BLAZE Pro 100L and ESPERASE 8.0L tend not to be deactivated as readily by a binding agent. Rather, increased pH and/or temperatures typically must be applied in order to deactivate enzymes that are somewhat or fully resistant to such a binding agent and may also be used in an accelerated membrane cleaning procedure.

Example 4

These tests were performed to show the working principle of a selected cleaning protocol of the invention in a laboratory membrane test apparatus. A semi-automated laboratory membrane test set up was used that contains four (4) membrane cells. Each of these cells contain 20*5 cm² membrane surface area. An Ultrafiltration (UF) membrane type was used for these tests and they are manufactured from polyethersulfone (PES) available from Alfa Laval type GR81PP. The four (4) cells run in parallel and a mean value is taken using the information collected from the four (4) cells. The fouling solution for these tests included 0.55 wt % of an 80 wt % WPC acid whey powder in soft water. The following identifies the steps for the test procedure:

1 Clean new membranes with a caustic solution: a sodium hydroxide (NaOH) based solution having a pH 12 and 0.0375 wt % of sodium-2-ethylhexylsulfate.
2 Measure the clean water flux (CWF) or CWF(1).
3 Implement fouling by implementing a one (1) hour filtration using the acid whey solution identified above at starting temperature of 2-3° C.
4 Rinse
5 Measure CWF(2)
6 Clean with the described cleaning solutions.
7 Rinse
8 Measure CWF(3)

As identified above, the clean water flux (CWF) is measured both before and after the fouling step, and following the cleaning step. CWF is calculated at a percentage using the following formula:

$$CWF\ Recovery\ (\%) = \frac{CWF\ following\ cleaning\ step}{CWF\ before\ fouling} \times 100$$

Table 23 that follows identifies three separate cleaning solutions that were tested and the CWF results for each of these solutions.

TABLE 23

| | Solution | | |
|---|---|---|---|
| | 1 | 2 | 3 |
| Compound | Concentration, wt % | | |
| sodium bicarbonate powder | 0.0005 | 0.0005 | 0.0005 |
| sodium carbonate (dense) | 0.0003 | 0.0003 | 0.0003 |
| potassium hydroxide | 0.0002675 | 0.0002675 | 0.0002675 |
| polyacrylic acid (M = 4.5k) | 0.000072 | 0.000072 | 0.000072 |
| alkyl glucoside (C8-10) | 0.00004375 | 0.00004375 | 0.00004375 |
| sodium-2-ethylhexylsulfate | 0.000115 | 0.000115 | 0.000115 |
| alkyl (C8) amino dipropionate mono Na-salt | 0.00006 | 0.00006 | 0.00006 |
| protease | 0.00025 | 0.00025 | 0.00025 |
| propylene glycol | 0.00235 | 0.00235 | 0.00235 |
| calcium chloride, dihydrate | 0.000002 | 0.000002 | 0.000002 |
| Na-formate | 0.0001 | 0.0001 | 0.0001 |
| alkyl benzene sulphonic acid | 0 | 0 | 0.0004176 |
| sodium hydroxide | 0 | 0 | 0.0000555 |
| Above components are mixed for 30 minutes and then the following compounds are added. | | | |
| ethylene diamine tetraacetic acid 4Na-salt | 0.0017 | 0.0034 | 0.0034 |

TABLE 23-continued

|  | Solution | | |
|---|---|---|---|
|  | 1 | 2 | 3 |
| Compound | Concentration, wt % | | |
| alkyl glucoside (C8-10) | 0 | 0.0000875 | 0.0000875 |
| sodium-2-ethylhexylsulfate | 0.00006 | 0.0001 | 0.0001 |
| alkyl (C8) amino dipropionate mono Na-salt | 0.00004 | 0.00005 | 0.00005 |
| Solution is again mixed for 30 minutes. | | | |
|  | Test Results | | |
| CWF before fouling, L/m$^2$*h*bar | 17.5 +/− 1.7 | 19.7 +/− 2.2 | 25.3 +/− 3.9 |
| CWF after fouling, L/m$^2$*h*bar | 2.2 +/− 1.0 | 1.7 +/− 0.7 | 1.9 +/− 0.4 |
| CWF after cleaning, L/m$^2$*h*bar | 12.2 +/− 3.1 | 12.2 +/− 2.0 | 24.7 +/− 3.9 |
| CWF Recovery, % | 69 +/− 11 | 62 +/− 7 | 98 +/− 4 |

As the results in Table 23 show, after cleaning the membrane with solution 3, the CWF is completely recovered and considered to be clean. No additional deactivation step nor membrane wetting is required to deactivate the enzyme and restore the wetting of the membrane, respectively. This inventive cleaning solution reduces the cleaning time significantly as well as the use of water for intermediate rinsing in subsequently steps and energy demand for heating up subsequently cleaning solutions and circulation of the cleaning solution and rinse steps.

Additionally, a concentrated product formulation would be provided that would allow the concentrations of the above-identified solutions to be achieved upon being diluted with water in the cleaning process.

Many modifications and other embodiments of the invention set forth herein will come to mind to one skilled in the art to which this invention pertains having the benefit of the teachings presented in the descriptions herein. It will be appreciated by those skilled in the art that changes could be made to the embodiments described herein without departing from the broad inventive concept thereof. Therefore, it is understood that this invention is not limited to the particular embodiments disclosed, but it is intended to cover modifications within the spirit and scope of the present invention as defined by the included claims.

That which is claimed:

1. A method of cleaning a membrane, the method comprising:
   pre-rinsing the membrane;
   cleaning the membrane using a solution comprising an enzyme and a buffer having a pH compatible with the enzyme, the solution having a temperature compatible with the membrane;
   preventing any divalent ions in the solution from precipitation;
   reducing an activity of the enzyme by adding a first binding agent capable of deactivating the enzyme to the solution, wherein the reducing activity of the enzyme is performed up to about 40 minutes,
      wherein the first binding agent is chosen from: ethylenediaminetetraacetic acid (EDTA) or any salt thereof, (hydroxyethyl) ethylenediaminetriacetic acid (HEDTA) or any salt thereof, potassium tripolyphosphate (KTPP), a phosphonic acid or any salt thereof, nitrilotriacetic acid (NTA) or any salt thereof, diethylene triamine pentaacetic acid (DTPA) or any salt thereof, glutamic acid diacetic acid (GLDA) or any salt thereof, methylglycinediacetic acid (MGDA) or any salt thereof, iminodisuccinc acid (IDS) or any salt thereof, aminocarboxylic acids or any salt thereof, hydroxyethane diphosphonic acid (HEDP) or any salt thereof, amino tris(methylenephosphonic acid) (ATMP) or any salt thereof, 2-phosphonobutane-1,2,4-tricarboxylic acid (PBTC) or any salt thereof, ethylenediamine tetra(methylene phosphonic acid) (EDTMP) or any salt thereof, diethylenetriamine penta(methylene phosphonic acid) (DTPMP) or any salt thereof, polyacrylate, acrylic acid-maleic acid copolymer or any salt thereof, or any combination thereof, and
      wherein the method is without rinsing the solution from the membrane between the time the solution is contacted with the membrane to the time used for reducing the activity of the enzyme; and
   post-rinsing the membrane for removal of the solution.

2. The method of claim 1, wherein the solution additionally comprises a second binding agent capable of forming complex with the divalent ions in the solution.

3. The method of claim 2, wherein the second binding agent capable of forming complex with the divalent ions comprises at least one of ethylenediaminetetraacetic acid (EDTA) and any salt thereof, (hydroxyethyl)ethylenediaminetriacetic acid (HEDTA) and any salt thereof, potassium tripolyphosphate (KTPP), a phosphonic acid and any salt thereof, nitrilotriacetic acid (NTA) and any salt thereof, diethylene triamine pentaacetic acid (DTPA) and any salt thereof, gluconic acid (GA) and any salt thereof, glutamic acid diacetic acid (GLDA) and any salt thereof, methylglycinediacetic acid (MGDA) and any salt thereof, iminodisuccinc acid (IDS) and any salt thereof, aminocarboxylic acids and any salt thereof, hydroxyethane diphosphonic acid (HEDP) and any salt thereof, aminotris(methylenephosphonic acid) (ATMP) and any salt thereof, 2-phosphonobutane-1,2,4-tricarboxylic acid (PBTC) and any salt thereof, ethylenediamine tetra(methylene phosphonic acid) (EDTMP) and any salt thereof, diethylenetriamine penta(methylene phosphonic acid) (DTPMP) and any salt thereof, a polyacrylate, an acrylic acid-maleic acid copolymer and any salt thereof, and sodium gluconate (Na-gluconate).

4. The method of claim 3, wherein a concentration of the second binding agent capable of forming complex with the divalent ions is from about 0.001 wt % to about 1 wt % based on the overall weight of the solution.

5. The method of claim 3, wherein the polyacrylate comprises a partially neutralized polyacrylic acid having a molecular weight in the range of about 2.5 k to about 5 k.

6. The method of claim 1, wherein the solution additionally comprises a surfactant.

7. The method of claim 6, wherein the surfactant comprises at least one of an anionic, a non-ionic and an amphoteric surfactant.

8. The method of claim 1, wherein the method fulfills at least one of the following:
   (i) a concentration of the first binding agent capable of deactivating the enzyme is from about 0.005 wt % to about 1 wt % based on the overall weight of the solution;
   (ii) a ratio by weight of the first binding agent capable of deactivating the enzyme to the enzyme is at least about 0.2 g binding agent to gram of enzyme;
   (iii) a ratio by weight of the first binding agent capable of deactivating the enzyme is from about 0.2 to about 200 g binding agent per gram of enzyme;
   (iv) a ratio by weight of the first binding agent capable of deactivating the enzyme is from about 0.2 to about 80 g binding agent per gram of enzyme.

9. The method of claim 1, wherein the method further comprises reducing activity of the enzyme by adding a reducing agent to the solution.

10. The method of claim 9, wherein the reducing agent comprises sodium dithionite.

11. The method of claim 10, wherein the method fulfills at least one of the following:
   (i) the sodium dithionite concentration is at least about 0.2 wt %;
   (ii) the sodium dithionite concentration is from about 0.25 wt % to about 10 wt %;
   (iii) the sodium dithionite concentration is from about 0.25 wt % to about 2.5 wt %.

12. The method of claim 1, wherein the method further comprises reducing activity of the enzyme by increasing the pH of the solution, or increasing the temperature of the solution, or both.

13. The method of claim 12, wherein the pH is increased from about 11 to about 13.

14. The method of claim 12, wherein the temperature is increased from about 50° C. to about 85° C.

15. The method of claim 12, wherein the pH is increased from about 12.0 to about 13.0 and the temperature is increased from about 50° C. to about 60° C.

16. The method of claim 12, wherein the pH is increased from about 11.0 to about 12.0 and the temperature is increased from about 60° C. to about 85° C.

17. The method of claim 1, wherein the membrane has been used for the treatment of proteins.

18. The method of claim 17, wherein the membrane has been used for the treatment of acid whey, sweet whey, skim milk, or combinations thereof.

19. The method of claim 1, wherein the method fulfills at least one of the following:
   (a) pre-rinsing the membrane is performed using a pre-rinse solution comprising water for a period of from about 2 minutes to about 30 minutes;
   (b) cleaning the membrane is performed for a period of from about 2 minutes to about 45 minutes;
   (c) post-rinsing the membrane is performed using a post-rinse solution comprising water for a period of from about 2 minutes to about 30 minutes.

20. The method of claim 1, wherein the enzyme is chosen from proteases, amylases, lipases, or any mixture thereof.

21. The method of claim 1, wherein the membrane has been used for the treatment of proteins, fats, or any combination thereof.

* * * * *